United States Patent [19]
Robison et al.

[11] Patent Number: 5,236,046
[45] Date of Patent: Aug. 17, 1993

[54] HETEROPOLYSACCHARIDE PREPARATION AND USE THEREOF AS A MOBILITY CONTROL AGENT IN ENHANCED OIL RECOVERY

[75] Inventors: Peter D. Robison, Poughkeepsie; Arthur J. Stipanovic, Wappingers Falls; Charles E. Stypulkoski, Beacon, all of N.Y.; Nick C. Wan, Newton, Mass.; Susan Easter, Durham, N.C.

[73] Assignee: Texaco Inc., White Plains, N.Y.

[21] Appl. No.: 642,937

[22] Filed: Jan. 18, 1991

Related U.S. Application Data

[63] Continuation-in-part of Ser. No. 209,389, Oct. 17, 1988, abandoned.

[51] Int. Cl.$^5$ .............................................. E21B 43/22
[52] U.S. Cl. ................................... 166/270; 166/246; 166/275; 166/295
[58] Field of Search .............. 166/246, 270, 273, 274, 166/275, 294, 295, 300; 435/101, 104, 822; 536/114; 523/130; 252/8.554

[56] References Cited

U.S. PATENT DOCUMENTS

| | | | |
|---|---|---|---|
| 3,908,760 | 9/1975 | Clampitt et al. | 166/246 |
| 4,259,451 | 3/1981 | Steenbergen et al. | 435/822 X |
| 4,269,939 | 5/1981 | Kang et al. | 435/104 |
| 4,634,667 | 1/1987 | Linton et al. | 435/101 X |
| 4,689,160 | 8/1987 | Steenbergen et al. | 435/104 |
| 4,716,966 | 1/1988 | Shu | 166/295 |
| 4,729,958 | 3/1988 | Drozo et al. | 435/104 X |
| 4,744,419 | 5/1988 | Sydansk et al. | 166/295 X |
| 4,782,901 | 11/1988 | Phelps et al. | 166/295 X |
| 4,941,533 | 7/1990 | Buller et al. | 166/246 X |

*Primary Examiner*—George A. Suchfield
*Attorney, Agent, or Firm*—James J. O'Loughlin; Vincent A. Mallare

[57] ABSTRACT

A variant strain of Agrobacter radiobacter has been found to produce a unique heteropolysaccharide containing D-galactose, D-glucose and pyruvic acid in approximate molar ratios of 2:15:2 in a seventeen member repeat unit having the structure shown below, wherein Glc represents D-glucose, Gal represents D-galactose and Pyr represents pyruvic acid, with the numerals indicating the positions of linkage in these ring structures. The heteropolysaccharide is useful in mobility control in oil reservoir formations, especially when crosslinked with trivalent metal cations ($Cr^{3+}$, $Al^{3+}$, $Fe^{3+}$ or $Ti^{3+}$) to form a gel which preferentially fills high permeability zones in such reservoirs.

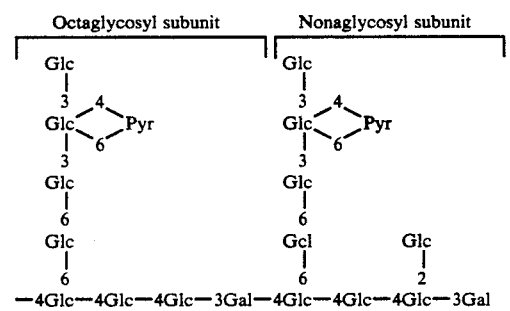

11 Claims, 3 Drawing Sheets

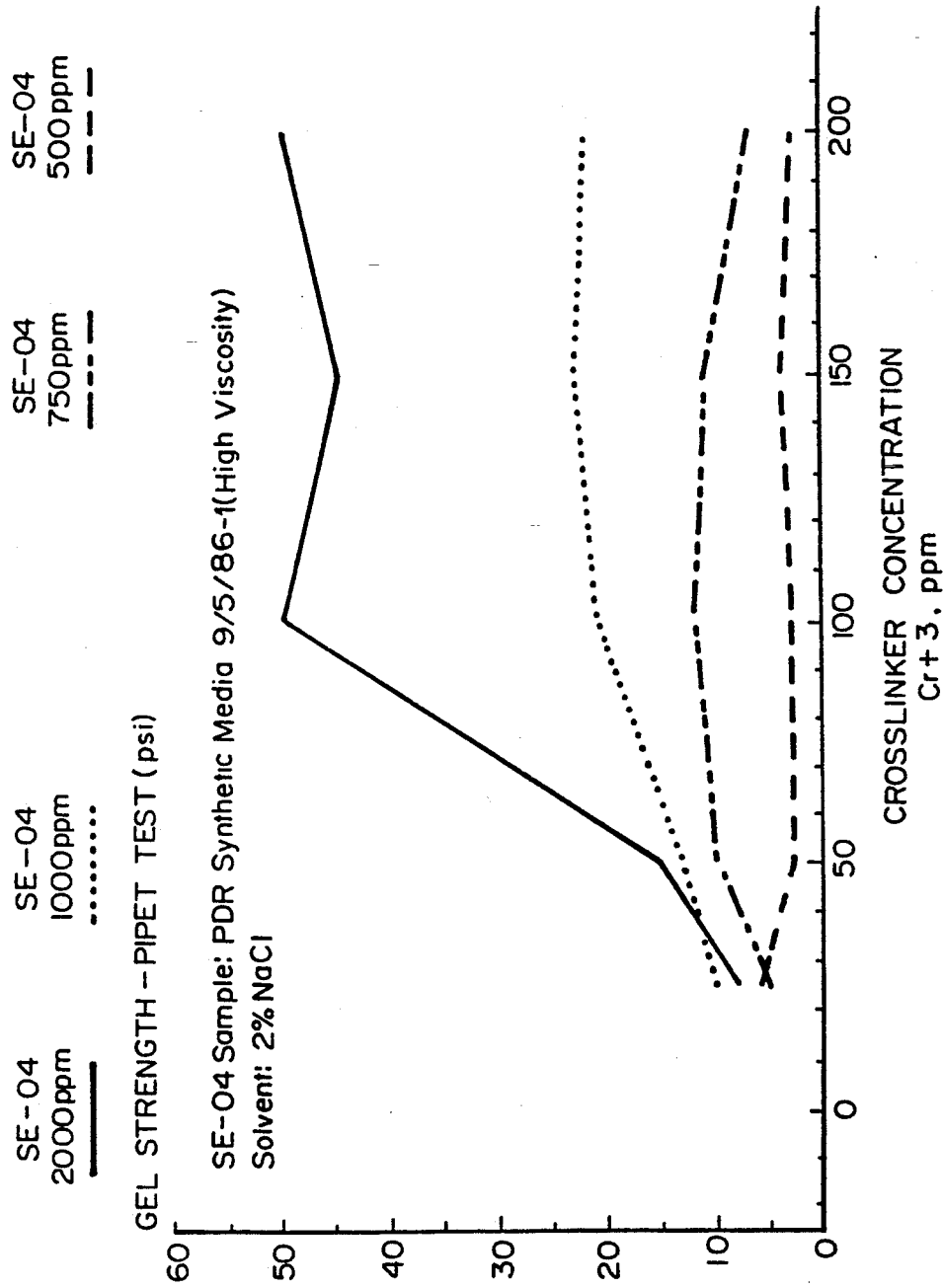

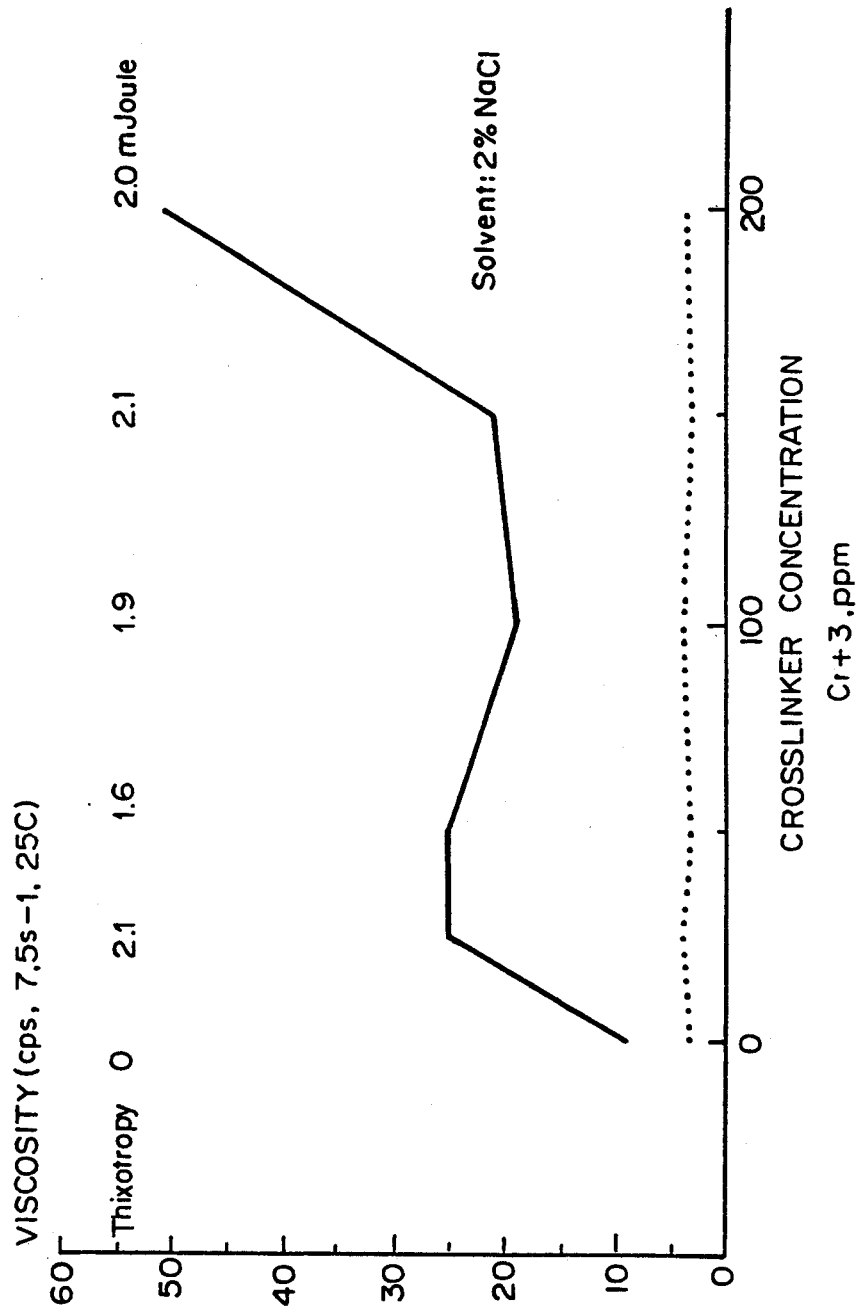

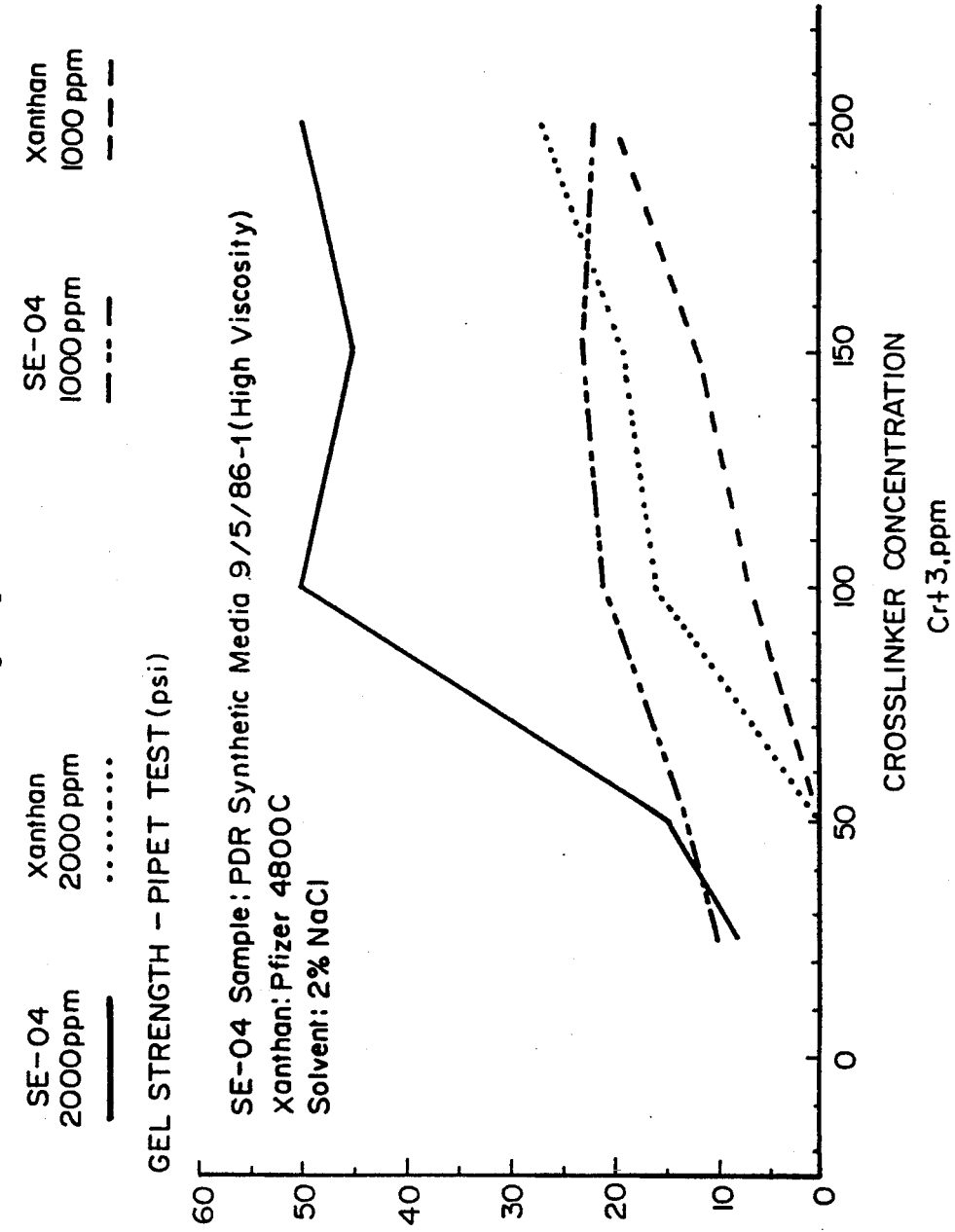

HETEROPOLYSACCHARIDE PREPARATION AND USE THEREOF AS A MOBILITY CONTROL AGENT IN ENHANCED OIL RECOVERY

REFERENCE TO RELATED APPLICATIONS

This application is a continuation in part of our coassigned U.S. application Ser. No. 07/209,389, filed Oct. 17, 1988 and now abandoned. The preparation of the heteropolysaccharide of the present invention and certain of its applications are also disclosed in coassigned U.S. application Ser. No. 07/243,379, filed Sep. 12, 1988 and now abandoned. Both of these applications are incorporated herein by reference.

BACKGROUND OF THE INVENTION

1. Field of the Invention

This invention relates to a novel strain of *Agrobacterium radiobacter* and, more particularly, to a heteropolysaccharide produced from such novel strain.

This invention further relates to oil recovery and, more particularly, to a gel-forming polysaccharide biopolymer which, when injected into an oil reservoir formation, enhances the oil recovery therefrom.

2. Information Disclosure Statement

In the recovery of oil from petroleum reservoirs, water flooding is a common practice used to increase the volume of oil recovered from a reservoir formation. Frequently, however, water will bypass oil-rich regions of the reservoir by travelling through layers of higher permeability. This process results in a lower oil recovery and higher production of water than is economical. Profile modification has become a popular technique for improving the efficiency of oil recovery by water flooding. By introducing a water-based, low permeability gel into the high permeability zones described, injected water is redirected toward oil-rich, underswept regions of the reservoir thereby improving oil recovery.

Commercially available profile modification systems usually employ water-soluble polymers cross-linked with $Cr^{3+}$ or $Al^{3+}$ cations to yield gels "in situ" in the reservoir formation. These polymers are, generally, synthetic hydrolyzed polyacrylamides or xanthan gum, a polysaccharide biopolymer. The latter molecule enjoys an advantage in that it is more tolerant to $Na^+$ and $Ca^{++}$ ions frequently found in reservoir fluids. This biopolymer is limited, however, to relatively low temperature oil fields. For example, xanthan gels cross-linked with $C^{3+}$ readily degrade in a temperature range of 60°–90° C. by a process known as syneresis (gel compaction coupled with water expulsion). Profile modification systems and processes are described by Abdo et al, in "Field Experience with Floodwater Diversion by Complexed Biopolymers", SPE/DOE 12642, presented at the SPE/DOE Fourth Symposium on Enhanced Oil Recovery held at Tulsa, OK, April 15-19, 1984 (using Pfizer "FLOCON 4800," based on a xanthan gum) and by Chang et al, in "Laboratory Studies and Field Evaluation of a New Gelant for High-Temperature Profile Modification", SPE 14235, presented at the 60th Annual Technical Conference of the Society of Petroleum Engineers held in Las Vegas, NV, September 22-25, 1985 (using Pfizer's "FLOPERM TM " 325, based on synthetic, thermosetting materials).

Water flooding is a common practice in oil recovery to increase the amount of oil obtained from a reservoir. Polymer flooding utilizes a viscosifying polymer to increase the efficiency of a water flood. Microbial heteropolysaccharides have been shown to be useful in this instance and xanthan gum has been most often used (see "Economic Value of Biopolymers and their Use in Enhanced Oil Recovery" by A. Gabriel, pages 191-204, in *Microbial Polysaccharides and Polysaccharases.* R. C. W. Berkely, G. W. Gooday and D. C. Ellsoods, eds, Academic Press, 1979). Various *Agrobacterium radiobacter* strains have been shown to produce heteropolysaccharides. For example, U.S. Pat. No. 4,259,451 discloses a culture of a variant strain of *A. radiobacter,* Accession No. ATCC 31643. U.S. Pat. No. 4,269,939 discloses a process for producing a heteropolysaccharide by bacterial fermentation of an organism deposited under Accession No. ATCC 31643, and U.S. Pat. No. 4,634,667 discloses a culture of a variant strain of *A. radiobacter* assigned Accession No. NCIB 11883 by the National Collection of Industrial Bacteria (U.K.).

U.S. Pat. No. 4,647,657 discloses a heterpolysaccharide prepared by the fermentation of a *Flavobacterium* species ATCC 53201 which has properties of a viscosity control agent in aqueous systems.

U.S. Pat. No. 4,738,727 discloses aqueous solutions of a heteropolysaccharide comprising glucose, galactose, pyruvic and succinic acid.

U.S. Pat. No. 4,640,358 discloses a process for oil recovery wherein is used a thickening agent, i.e., a polyvalent metal ion complex of a fungal polysaccharide, a scleroglucan, to improve the oil recovery.

U.S. Pat. No. 4,347,146 discloses the employment of a poly(glucosylglucan) as a thickening agent for an aqueous driving fluid in a process for producing petroleum from a petroleum-bearing subterraneon formation.

SUMMARY OF THE INVENTION

It is an object of the present invention to provide a thickening agent which is stronger than existing agents and will withstand higher temperatures and improve the oil recovery from petroleum reservoirs.

This invention encompasses a novel variant form of *Agrobacterium radiobacter,* strain SE04, and its production of a high viscosity heterpolysaccharide having a unique structure on a synthetic medium. A permanent deposit of the organism was made with the American Type Culture Collection under Accession Number 53271 on Sep. 25, 1985. The fermentation medium comprises sources of carbon and nitrogen. Suitable sources of carbon include sugars such as glucose, xylose, fructose, arabinose, galactose, mannose, lactose, maltose and sucrose. Any suitable nitrogen source can be used, preferably corn steep liquor because of its ready availability and proven effectiveness. Other suitable nitrogen sources include yeast extracts, peptones and tryptone and inorganic sources such as ammonium chloride, sodium nitrate and similar ammonium salts and nitrates. Suitable types and amounts of vitamins and trace metals should also be present. Surprisingly, it has been found that heteropolysaccharides of increased specific viscosity can be produced when the nitrogen source comprises an amino acid or related compound such as glutamic acid, glutamine, aspartic acid, asparagine and arginine, glutamic acid being presently preferred. Suitable selections of vitamins and trace metals as described in Example 6 below facilitate this process.

The structure of the heteropolysaccharide is shown below.

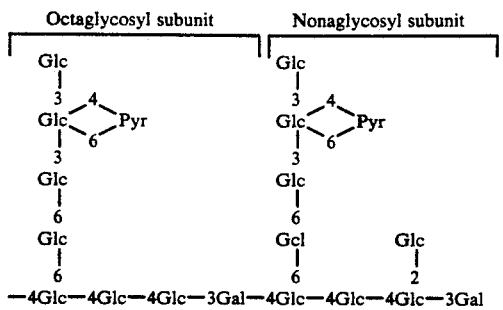

In the structural formula shown above, Glc represents D-glucose, Gal represents D-galactose and Pyr represents pyruvic acid, with the numerals indicating the positions of linkage in these ring structures. The octaglycosyl and nonaglycosyl subunits are as indicated.

In one embodiment, this invention provides an improved method for enhancing the oil recovery from an oil-rich reservoir formation having a layer of high permeability and into which reservoir water or other fluid or gas is fed. The improvement in the method comprises injecting this novel polysaccharide biopolymer cross-linked with a trivalent cation into the zone of high permeability to yield "in situ" a thermally stable, water-based low-permeability gel, whereby the water or other fluid or gas fed into the reservoir is directed toward the oil-rich deposits therein, thereby improving the oil recovery therefrom. In the improved method, the cation used is selected from group consisting of trivalent chromium ($Cr^{3+}$) aluminum ($Al^{3+}$), iron ($Fe^{3+}$) and titanium ($Ti^{3+}$).

Another embodiment of the invention is an improved method for enhancing oil recovery from a reservoir comprising at least one step of introducing an aqueous drive fluid containing at least about 250 ppm of the novel polysaccharide into the reservoir through at least one injection well therein to facilitate the recovery of oil from at least one production well therein.

BRIEF DESCRIPTION OF THE DRAWINGS

The present invention and its advantages will be better understood when considering the present invention description in conjunction with the results of the Gel Strength Test (among other examples) and drawings in which:

FIG. 1 is a graph showing the strength of biopolymer gels of the present invention with increasing polymer and cross-linker concentration;

FIG. 2 is a graph illustrating the viscosity of the present biopolymer gels with increasing cross-linked concentration after two (2) days; and FIG. 3 is a graph comparing the gel strength of xanthan gums and the present biopolymer gels.

DETAILED DESCRIPTION OF THE INVENTION

In the improvement of recovering oil according to the present invention, a cross-linked biopolymer can be used.

The biopolymer SE-04 is an extracellular polysaccharide produced from a particular bacterium, a strain of *Agrobacterium radiobacter*. The polymer-producing bacterium is generally isolated from a soil sample as fully described below.

The polymer-producing bacterium (SE04) employed in the present process is a novel bacterium that was isolated from a soil sample taken from Orange Lake, Newburgh, N. Y. A loopful of a water suspension was streaked onto yeast malt (YM) agar plates. The YM agar was formed by adding to 1,000 ml of distilled water, 41 gm of a mixture containing 3 parts by weight of a yeast extract, 3 parts by weight of a malt extract, 5 parts by weight of a peptone and 10 parts by weight of dextrose (mixture supplied by Ditco Laboratories, Inc., Detroit, Mich.) together with 20 parts by weight of agar. The YM agar plates were incubated at 28° C. for 48–72 hours. After incubation, the plates were examined and the slimy colonies were transferred to fresh YM agar plates for further incubation. The cultures were purified by subculturing onto YM agar plates. The purified cultures were finally transferred onto YM slants and maintained in the lyophilized state.

An air-dried film of a 24-hour old culture was stained by the method Gram (Manual of Methods for General Bacteriology, American Society of Microbiology) and was found to be gram negative. The cells of the bacterium are motile, non-sporeforming, short rods and have an average size of 1.8×0.8 micron. The organism usually occurs as single cells and only rarely forms short chains.

On YM agar, the bacterium typically grows up to colonies of about 1 mm in diameter in 72 hours. The organisms forms circular, entire, smooth, off-white and mucoid colonies. The optimum growth temperature is about 28°–30° C. The optimum pH for growth is about 7.5±0.5.

SE04, as referred to herein, is identified as a *Agrobacterium radiobacter* strain. The physiological and biochemical characteriestics of SE04 are summarized below in Table 1. The strain is unique, as it spans both biovars of *A. radiobacter* and cannot be classified as belonging to either as shown below in Table 2. The bacterium was found to be an obligate aerobe.

TABLE 1

| CHARACTERISTICS OF SE04 | | | |
|---|---|---|---|
| Gram positive | − | Gelatinase | − |
| Gram negative | + | Tween 20 hydrolysis | − |
| Gram variable | − | Tween 80 hydrolysis | − |
| Motile at RT | + | Indole | − |
| *Flagella peritrichous* | + | Simmons citrate growth | + |
| *Flagella lophotrichous* | − | Urease | + |
| *Flagella monotrichous* | − | Nitrate to nitrite | − |
| *Flagella laterial* | − | Nitrite reduction | − |
| 4° C. growth | − | Nitrite to nitrogen gas | − |
| 25° C. growth | + | Hydrogen sulfide (TSI)* | − |
| 30° C. growth | + | Lysine decarboxylase | − |
| 37° C. growth | + | Arginine (Mollers) | − |
| 1° C. growth | − | Ornithine decarboxylase | − |
| Fluorescein produced | − | Phenylalanine deamination | NG |
| Pyocyanine produced | − | Lecithinase | − |
| Diffusible orange | − | Phosphatase | − |
| Diffusible yellow | − | Catalase | + |
| Diffusible purple | − | Oxidase | + |
| Non-diffusible green | − | Gluconate oxidation | − |
| Other non-diffusible pigments | − | Growth on malonate as SCS | − |
| | | Tyrosine degradation | − |
| Melanin pigment produced | − | dl-hydroxybutyrate growth | − |
| pH 6.0 growth | + | PHB accumulation | − |
| 3% NaCl growth | − | Deoxyribonuclease | − |
| 6.5% NaCl growth | − | Growth on 0.05% cetrimide | − |
| MacConkey agar growth | + | Growth on acetate as SCS | + |
| Skim milk agar growth | + | Mucoid growth on Glucose | + |
| Aesculin hydrolysis | + | agar | |
| Casein hydrolysis | − | 3-ketolactose from | − |
| Starch hydrolysis | − | lactose | |

TABLE 1-continued
CHARACTERISTICS OF SE04

| | |
|---|---|
| Testosterone degradation | − |

*Lead acetate strip
NG = no growth

FERMENTATION OF CARBOHYDRATE IN O-F MEDIUM

| | |
|---|---|
| Acid from L-arabinose | + |
| Acid from cellobiose | + |
| Acid from ethanol | + |
| Acid from D-fructose | + |
| Acid from D-glucose A02 | + |
| Acid from D-glucose AnO2 | − |
| Alkaline pH in D-glucose | − |
| Acid from glycerol | + |
| Acid from lactose | + |
| Acid from maltose | + |
| Acid from D-mannitol | + |
| Acid from D-mannose | + |
| Acid from L-rhamnose | + |
| Acid from D-ribose | + |
| Acid from sucrose | + |
| Acid from trehalose | + |
| Acid from D-xylose | + |
| Acid from adonitol | + |
| Acid from adonitol | + |
| Acid from i-inositol | + |
| CONTROL | K |

+ = acid
− = no change
K = alkaline

SOLE CARBON SOURCES IN STANIER'S MINERAL BASE

| | | | |
|---|---|---|---|
| L-arabinose | + | L-malate | + |
| cellobiose | + | pelargonate | W |
| D-fructose | + | propionate | − |
| D-glucose | − | guinate | + |
| lactose | + | succinate | + |
| maltose | + | 1-+-tartrate | − |
| D-mannitol | + | malerate | − |
| L-rhamnose | + | B-alanine | + |
| D-ribose | + | D-A-alanine | − |
| D-sorbitol | + | betaine | W |
| sucrose | + | glycine | − |
| trehalose | + | L-histidine | + |
| D-xylose | + | DL-norleucine | − |
| adonitol | + | L-proline | + |
| erythritol | + | D-tryptophan | − |
| glycerol | + | L-vline | − |
| ethanol | − | DL-arginine | |
| geranoil | − | benzylamine | − |
| i-inositol | + | butylamine | − |
| sebacic acid | − | putrescine | − |
| acetamide | − | mesoconate | − |
| adipate | − | DL-glycerate | − |
| benzoate | − | L-tryptophan | + |
| butyrate | + | | |
| citraconate | − | | |
| D-gluconate | + | | |
| M-hydroxybenzoate | − | | |
| 2-ketogluconate | − | | |
| DL-lactate | + | | |
| CONTROL | − | | |

W = weak

TABLE 2
COMPARISON OF SE04 WITH OTHER AGROBACTERIUM SPECIES

| | Agrobacterium | SE04 |
|---|---|---|
| Gram negative | + | + |
| Motile | + | + |
| Peritrichous | + | + |
| Aerobic | + | + |
| Slime on Carbohydrate containing media | + | + |
| Chemoorganotroph | + | + |
| Acid from: | | |
| D-glucose, L-arabinose | + | + |
| D-xylose, D-fructose | + | + |
| Adonitol, D-mannitol | + | + |
| L-rhamnose, Lactose | + | + |
| Maltose, Cellobiose | + | + |
| Sucrose, rehalose | + | + |
| Gelatin | − | − |
| Indole | − | − |
| Catalase | + | + |
| Starch Hydrolysis | − | − |
| Tween 80 | − | − |
| Fluorescein | − | − |
| Casein hydrolysis | − | − |
| Esculin | d | + |
| Growth on Benzoate, Phenylalanine | − | − | d = 11-89% of strains are positive

DIFFERENTIATING AGROBACTERIUM FROM OTHER TAXA

| | Alcaligenes | Pseudomonas cepacia | Agrobacterium |
|---|---|---|---|
| Polar flagella | − | + | − |
| Peritrichous flagella | + | − | + |
| Urease | − | d | + |
| Utilization of: | | | |
| D-glucose | D | + | + |
| L-arabinose | − | + | + |
| L-rhamnose | − | − | + |
| Sucrose | − | + | + |
| Lysine Decarboxylase | − | + | − |
| 3-ketolactose | − | − | d | d = 11-89% of strains are positive
D = different reactions in different TAXA

COMPARISON OF AGROBACTERIUM BIOVAR 1 AND BIOVAR 2

| | Agrobacterium | | |
|---|---|---|---|
| | Biovar 1 | Biovar 2 | SE04 |
| Growth at 35° C. | + | − | + |
| Growth with 3% NaCl | + | d | − |
| 3-Ketolactose | + | − | − |
| Utilization of Erythritol | − | + | + |
| Na malonate | − | + | − |
| Reduction of NO$_2$ | d | − | − |
| PHB inclusions | − | + | − |
| H$_2$S lead acetate paper | + | − | + | d = 11-89% of strains are positive

TUMORGENICITY ON CARROT SLICES

| | |
|---|---|
| A. tumefaciens (ATCC 15955) | + |
| A. radiobacter (ATCC 19358) | − |
| SE04 | − |
| Uninoculated carrot | − |

6 weeks incubation at room temperature

In carrying out one embodiment of the present invention, a suitable nutrient fermentation medium, preferably corn steep liquor (CSL, 2.5 percent glucose, 0.4 percent corn steep liquor, 0.5 percent K$_2$HPO$_4$, 0.01 percent MgSO$_4$, pH=6.8-7.0) is inoculated with a culture of the bacterium and permitted to incubate at a temperature of about 26° C. to 30° C., preferably 28° C., for a period of about 170 to 190 hours. Maximum heteropolysaccharide is produced in CSL medium when the glucose concentration is around 2.3 to 2.7 percent (w/v) and preferably 2.5 percent. Besides glucose, the organism can also use other carbon sources such as xylose, fructose, arabinose, galactose, mannose, lactose, maltose and sucrose to produce polymer.

The optimum pH for production of the heteropolysaccharide is in the range of about 7.0 to 8.0 and preferably about 7.5. Control of the pH can generally be obtained by the use of a buffer compound such as dipotassium acid phosphate at a concentration of about 0.4 to about 0.6 weight percent of the fermentation medium. Potassium salts of phosphoric acid, e.g., $KH_2PO_4$, $K_2HPO_4$ may be used as a buffer. The pH can also be controlled by using a pH controller coupled with a source of a suitable base, e.g., potassium hydroxide and a source of a suitable inorganic acid, e.g., hydrochloric acid.

Besides the carbon source, a source of nitrogen is also required in the fermentation. The nitrogen source is generally organic in nature. For example, yeast extract, malt extract, peptone, distiller dried solubles, or concentrates of corn solubles from corn wet milling processes, preferably corn steep liquor can be used. Corn steep liquor is a preferred nitrogen source for the heteropolysaccharide production. An amount ranging between 0.3–0.5 percent, preferably 0.4 weight percent of the fermentation medium is satisfactory. Inorganic nitrogen sources such as $NH_4Cl$ or $NaNO_3$ can also be used.

A trace quantity of magnesium (0.0024 weight percent) and phosphorus (0.07–0.1 weight percent) is also present in the fermentation medium. A suitable source of magnesium ions include water soluble magnesium salts such as magnesium sulfate heptahydrate, magnesium chloride and magnesium acid phosphate. Phosphorus is usually added in the form of a soluble potassium salt.

It is very essential to have a sufficient quantity of oxygen available for the fermentation. If either too much or too little oxygen is available, the production of the heteropolysaccharide is retarded.

Towards the end of the fermentation (after 96 hours) the level of dissolved oxygen does not seem as critical.

On completion of the fermentation, the desired heteropolysaccharide may be recovered by first removing the cells by centrifugation or by enzymatic (protease) treatment. The fermentation beer is usually diluted to a viscosity range of 25–50 cps. The diluted broth is then centrifuged at 30,000 x g for 30 minutes. The supernatant is collected and 2 percent potassium chloride is added. Two to three times volume of a solvent, e.g., isopropanol, acetone, methanol, ethanol, n-butanol, sec-butanol, tert-butanol, isobutanol and noamyl alcohol is added to precipitate the heterpolysaccharide from the supernatant. Isopropanol is preferred.

The carbohydrate composition of the heteropolysaccharide was determined after hydrolysis with 0.5M $H_2SO_4$ for 16 hours at 100° C. After precipitation with BaOH, the solution was analyzed by HPLC using a Bio Rad Aminex HPX-87P carbohydrate column at 85° C. with $H_2O$ as the solvent. Glucose and galactose were found at a ratio of about 9:1. Pyruvate and succinate were also found at levels of 2–4 percent. Thus, the heteropolysaccharide was described in the parent of the present application as comprised of glucose and galactose. For example, the polysaccharide may be composed of about 80 percent glucose and 10 percent galactose. Also, the heterpolysaccharide may be substituted by pyruvate and a hemi-ester of succinic acid.

As will be seen from certain of the following examples, the heteropolysaccharide has high viscosity when dissolved in water in low concentration. Because of the above property and its pseudoplasticity, sensitivity to shear, stability with salts and its overall rheology, the heteropolysaccharide is useful as a mobility control agent in enhanced oil recovery, as thickeners in edible products, cosmetic preparations, pharmaceutical vehicles and oil field drilling fluids and also as an emulsifying, stabilizing and sizing agent.

According to the present invention, the heteropolysaccharide SE-04 can be cross-linked with a trivalent metal cation selected from the group consisting of chromium ($Cr^{3+}$), aluminum ($Al^{3+}$), iron ($Fe^{3+}$) and titanium ($Ti^{3+}$), the preferred cation being chromium ($C^{3+}$).

In the methods of the present invention for enhanced oil recovery, the concentration of biopolymer should be at least about 250 ppm and may range from about 500 to about 10,000 ppm and, preferably, about 2,000 ppm. The concentration of the trivalent cation, i.e., the cross-linking agent, may have a concentration ranging from about 25 to about 225 ppm and, preferably, from about 100 to about 200 ppm. The resulting gels can be introduced to a formation or reservoir through injection wells so that they fill zones of high permeability enroute to the producing wells. Such gels can also be introduced through producing wells which are temporarily shut in to fill high permeability zones near such producing wells.

The low-permeability gel is thermally stable at temperatures ranging from about 40° C. to about 125° C., allowing the use of the present invention, i.e., cross-linked biopolymer, at any time or location where oil may be recovered. The thermal stability of these gels at temperatures ranging from about 110° C. to about 125° C. is particularly noteworthy.

The polysaccharide SE-04 of the present invention as indicated above, readily forms gels at low polymer concentrations in the presence of trivalent cations such as $Cr^{3+}$ ions. The polysaccharide chemical structure is approximately 80 percent glucose and 10 percent galactose substituted with succinate and pyruvate. These substituents provide anionic sites for complexation, i.e., cross-linking, with a trivalent cation such as chromium ($Cr^{3+}$) Also, the strength of the gel can be modified by varying the concentration of the biopolymer or the trivalent cation. For example, an optimum gel may be formed with the biopolymer having a concentration of about 2000 ppm and the trivalent cation, e.g., chromium ($Cr^{3+}$) having a concentration of about 200 ppm. However, the gels are satisfactory when formed with low concentrations of the biopolymer, i.e., about 1000 ppm, and the trivalent cation, i.e., about 25 ppm. This is quite favorable when compared with known xanthan gels.

An important purpose of the present invention is to provide a gel capable of withstanding temperatures in excess of 100° C. Thus, the gels formed according to the present invention are thermally stable at temperatures ranging up to about 125° C.

EXAMPLES

The following examples are provided to more fully illustrate the present invention, including the preparation of the novel biopolymer SE-04 and its advantages in enhancing the recovery of oil from oil-rich reservoirs.

EXAMPLE 1

Fermentation of Biopolymer

The fermentation was carried out in a 7-liter fermentor. The seed was prepared by inoculating 28 ml of CSL medium and transferring the culture to a Fernbach flask with 500 ml of CSL medium. The 500 ml inoculum was transferred into the fermentor. The fermentation temperature was 28° C. and the pH was controlled at 7. The dissolved oxygen level was maintained at 60 percent and the culture was agitated at 300 rpm.

By 100 hours the viscosity of the beer was 4,000 cPs and by 160 hours the viscosity was 6000 cPs and practically all of the glucose had been consumed. The beer was diluted, centrifuged at 30,000 x g to remove cells and 2 percent KCl added to it. The heteropolysaccharide was precipitated by mixing the beer with twice the volume of isopropanol and recovered by straining it from the fermentation liquid. It was pressed to remove excess fluid and dried under reduced pressure. The heteropolysaccharide was obtained as a white colored powder (yield = 1.7 percent biopolymer in broth and percent conversion = 60).

EXAMPLE 2

COMPOSITIONAL/STRUCTURAL ANALYSIS OF BIOPOLYMER

At the assignee's direction the heteropolysaccharide secreted by *Agrobacterium Radiobacter* (ATCC 53271) was analyzed in detail by the Complex Carbohydrates Center, a branch of the university of Georgia.

This extracellular anionic polysaccharide was found to contain D-galactose, D-glucose, and pyruvic acid in the molar ratio 2.0:15.0:2.0. Analysis of the methylated polysaccharide indicated the presence of terminal non-reducing glucosyl, 3-, 4-, 6-, 2,4-, and 4,6-linked glucosyl residues, 3-linked 4,6-0-[(S)-1-carboxyethylidene]-glucosyl residues and 3-linked galactosyl residues. Partial acid hydrolysis of the methylated polysaccharide followed by reduction with NaBH₄ and then O-ethylation gave a mixture of alkylated oligoglycosyl alditols that were separated by reversed phase h.p.l.c. and analyzed by $^1$H-n.m.r spectroscopy, g.l.c.-m.s. and glycosyl-linkage composition analysis. Smith degradation of the polysaccharide gave three diglycosyl alditols that were separated by semi-preparative, high-pH anion exchange chromatography and analyzed by $^1$H-n.m.r spectroscopy, g.l.c.-m.s., and glycosyl-linkage composition analysis. The polymer obtained by NaBH₄ reduction of the periodate-oxidized polysaccharide was methylated and the non-cyclic acetals hydrolyzed with aqueous 90 percent formic acid to generate a mixture of partially O-methylated mono- and diglycosyl alditols. The partially O-methylated oligoglycosyl alditols were O-ethylated. The resulting alkylated oligoglycosyl alditols were separated by reversed phase h.p.l.c. and then characterized by $^1$H-n.m.r spectroscopy, g.l.c.-m.s., and glycosyl-linkage composition analysis. Surprisingly, the results from the studies described below provide strong evidence that this acidic polysaccharide secreted by this robacterium has an heptadecasaccharide repeating unit having the structure indicated below.

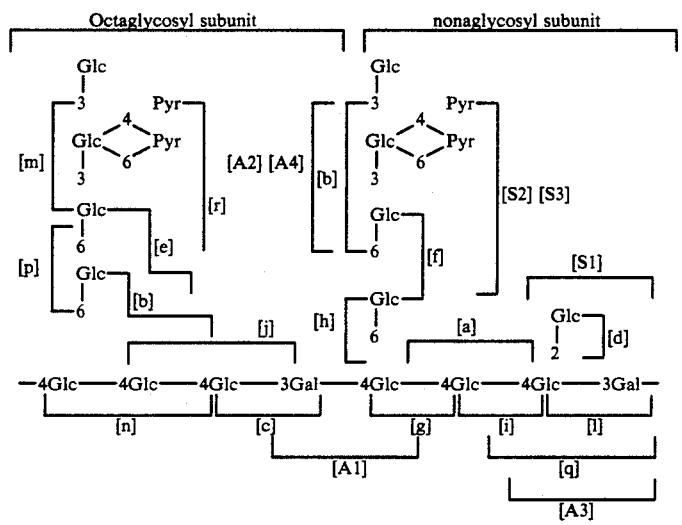

In the proposed structure above, the octaglycosyl and nonaglycosyl subunits are as indicated, and symbols [a] through [q] represent the mono-, di- and triglycosyl alditol fragments released by partial acid hydrolysis of the methylated polysaccharide. Symbols [S1] through [S3] correspond to the diglycosyl alditol fragments released by Smith degradation of the polysaccharide and symbols [A1] through [A3] correspond to the mono- and diglycosyl alditol fragments released by formolysis of the methylated polymer obtained after NaBH₄ reduction of the periodate oxidized polysaccharide, as described below. The structures of the oligoglycosyl fragments are shown in Tables 4 through 7.

RESULTS AND DISCUSSION

Glycosyl-residue and glycosyl-linkaqe compositions of the polysaccharide. Glycosyl-residue composition analysis showed that the acidic polysaccharide secreted by the *Agrobacterium species* contains D-galactosyl and D-glucosyl residues in the ratio 2.0:15.0. No glycosyluronic acid residues were detected in the polysaccharide after formation and analysis of the constituent TMS methyl ester, methyl glycosides. The polysaccharide contains about 6 mole percent pyruvic acid. Analysis of the TMS methyl ester, methyl glycosides by g.l.c.-e.i.m.s. showed the presence of a derivative whose e.i. mass spectrum was identical to that of the TMS methyl ester, methyl glycoside of 4,6-0-(1-carboxyethylidene)-D-glucose, as reported by W. F. Dudman and J. Lacey in *Carbohydr. Res.*, Vol. 145 (1986), pages 175-191.

Attempts to fractionate the polysaccharide by precipitation with hexadecyltrimethylammonium bromide (CTAB) according to the methods of J. E. Scott, *Methods Carbohydr. Chem.*, Vol. 5 (1965), pages 38-44 and Robertson, Albersheim et al, in *Plant Physiol.*, Vol. 67 (1981), pages 389-400, and by ion-exchange chromatography on DEAE-Trisacryl were unsuccessful; in each case the single product had a glycosyl composition identical to that of the native polysaccharide.

Glycosyl-linkage composition analysis shown in Table 3, column I below indicated that the polysaccharide contains two branched glycosyl residues: namely, 2,4-linked and 4,6-linked glucosyl residues. However, since the polysaccharide was not completely soluble in methyl sulfoxide, incomplete methylation could not be discounted. Furthermore, there are examples of selected oxygen atoms that are difficult to methylate; for example, position 0-2 of the 3-linked glucosyl residues in a polysaccharide produced by *Alcaligenes sp.* (ATCC 31555) was found to be resistant to complete methylation, as reported by O'Neill et al in *Carbohydr. Res.*, Vol. 147 (1986), pages 295-313.

TABLE 3

Glycosyl-Linkage Composition of the Acidic Polysaccharide Secreted by *Agrobacterium sp.*

| Glycosyl Linkage | I | II | III |
|---|---|---|---|
| | mole % | | |
| T-Glcp | 19.0 | 12.5 | 15.8 |
| 3-Glcp | 10.0 | 18.4 | 18.3 |
| 4-Glcp | 16.4 | 14.2 | 18.3 |
| 6-Glcp | 11.5 | 9.4 | 11.3 |
| 2,4-Glcp | 9.1 | 9.6 | 7.3 |
| 4,6-Glcp | 12.6 | 15.3 | 12.5 |
| 3,4,6-Glcp | 12.6 | 8.5 | 4.0 |
| 3-Galp | 8.8 | 11.4 | 12.4 |

1. Methylated polysaccharide
2. Methylated, partially acidic depolymerized polysaccharide
3. Double methylated, partially acidic depolymerized polysaccharide The ratio of the 2,4-linked to the 4,6-linked glucosyl residues (1.0:1.7) indicated that the 2,4-linked glucosyl residue is present about half as often as the 4,6-linked glucosyl residues.

The Agrobacterium polysaccharide was soluble in methyl sulfoxide after partial depolymerization by heating for one hour at 80° C. in 50 mM trifluoroaetic acid. The glycosyl-linkage composition of the partially depolymerized polysaccharide (In Table 3, compare column II with column III) was similar to the native polysaccharide. The major effect of the partial hydrolysis With acid was the cleavage of the 1-carboxyethylidene groups, resulting in the conversion of 3,4,6-linked glucosyl residues into 3-linked glucosyl residues.

The $^1$H-n.m.r spectrum of the polysaccharide ($^2$H$_2$O at 75° C.) contained an envelope of signals for anomeric protons between δ4.30 and 4.75. These were assigned to β-linked glycosyl residues, as suggested by Aman, Albersheim et al in *Carbohydr. Res.*, Vol. 95 (1981), pages 263-282. No signals were observed in the region between δ5.00 and 5.50, which indicated that none of the glycosyl residues present in the polysaccharide were α-linked. A broad signal at δ1.45 was assigned to the methyl protons of the 1-carboxyethylidene groups, according to Aman et al., supra.

The combined results of glycosyl-linkage composition analysis and $^1$H-n.m.r. spectroscopy are in agreement with a polysaccharide repeating unit composed of about 17 β-linked glycosyl residues containing two 1-carboxyethylidene groups attached to 0-4 and 0-6 of two 3-linked glucosyl residues.

FORMOLYSIS OF THE METHYLATED POLYSACCHARIDE

Fragmentation of the methylated polysaccharide by heating with 90 percent formic acid for 30 minutes at 80° C. cleaved sufficient amounts of the glycosyl linkages to give good yields of di- and triglycosyl fragments.

STRUCTURAL CHARACTERIZATION OF THE PARTIALLY METHYLATED PARTIALLY ETHYLATED OLIGOGLYCOSYL ALDITOLS

The components in each of the h.p.l.c fraction eluted above were characterized by $^1$H-n.m.r spectroscopy, g.l.c.-c.i.m.s., g.l.c.-e.i.m.s., and glycosyl linkage composition analyses. Some of the h.p.l.c. fractions contained more than one alkylated oligoglycosyl alditol. However, seventeen partially methylated, partially ethylated oligoglycosyl alditols were unambiguously structurally characterized.

The $^1$H-n.m.r. spectra of thirteen alkylated oligoglycosyl alditols contained signals for anomeric protons in the region δ4.20-4.80. The vicinal coupling constants ($J_{1,2}$) for the signals of the anomeric protons were between 7.0-7.8 Hz, which established that the anomeric linkages of the alkylated oligoglycosyl alditols were all β-linked. The results of $^1$H-n.m.r analyses of the alkylated oligoglycosyl alditols are consistent with the results of $^1$H-n.m.r. analysis of the polysaccharide, which also indicated that all the glycosyl residues are β-linked.

Ammonia c.i. mass spectra of the alkylated oligoglycosyl alditols contained intense ions that correspond to the [M+NH$_4$]$^+$ ions of the mono-, di-, and triglycosyl alditol derivatives (see Tables 4 and 5 below). These pseudomolecular ions gave information about the molecular weight and number of O-ethyl groups in the oligoglycosyl derivatives.

TABLE 4

Some characteristics of the structurally characterized, alkylated monoglycosyl alditols obtained from the methylated, hydrolyzed, reduced (NaB$_2$H$_4$), and ethylated Agrobacterium sp (ATCC 53271) polysaccharide.

| Oligosaccharide Structure | Fragment | g.l.c. retention time (min) | c.i.-m.s [M + 18]$^+$ m/2 | e.i. mass spectra | | | | | |
|---|---|---|---|---|---|---|---|---|---|
| | | | | aA$_1$ m/2 | aA$_1$-32 m/2 | aA$_1$-46 m/2 | aA$_1$-74 m/2 | aldJ$_1$ m/2 | aldJ$_2$ m/2 |
| Et-4Glc-3Gal | [c] | 10.8 | — | 253 (5) | 201 (28) | — | — | 324 (77) | 264 (22) |

TABLE 4-continued

Some characteristics of the structurally characterized, alkylated monoglycosyl alditols obtained from the methylated, hydrolyzed, reduced (NaB$_2$H$_4$), and ethylated Agrobacterium sp (ATCC 53271) polysaccharide.

| Oligosaccharide Structure | Fragment | g.l.c. retention time (min) | c.i.-m.s [M + 18]$^+$ m/2 | e.i. mass spectra | | | | | |
|---|---|---|---|---|---|---|---|---|---|
| | | | | aA$_1$ m/2 | aA$_1$-32 m/2 | aA$_1$-46 m/2 | aA$_1$-74 m/2 | aldJ$_1$ m/2 | aldJ$_2$ m/2 |
| Glc—2Glc<br>　　4<br>　　\|<br>　　Et | [d] | 10.3 | 531 | 219 (3) | 187 (24) | — | — | 338 (18) | 278 (1) |
| Et-3Glc-6Glc | [f] | 10.7 | 531 | 233 (9) | 201 (12) | 187 (25) | — | 338 (5) | 264 (14) |
| Et<br>\|<br>6<br>Et—4Glc—4Glc | [g] | 10.9 | 545 | 247 (8) | 215 (23) | 187 (3) | — | 324 (8) | 264 (30) |
| Et—6Glc—6Glc<br>　　　　4<br>　　　　\|<br>　　　　Et | [h] | 11.7 | 545 | 233 (4) | 201 (15) | 187 (2) | — | 338 (3) | 278 (7) |
| Et—4Glc—4Glc<br>　　2<br>　　\|<br>　　Et | [i] | 10.7 | 545 | 233 (6) | 201 (33) | 187 (9) | — | 338 (18) | 278 (3) |
| Et—4Glc—3Gal<br>　2<br>　\|<br>　Et | [l] | 10.9 | 545 | 247 (2) | 215 (25) | 201 (7) | — | 324 (6) | 264 (20) |
| Et—3Glc—3Glc<br>　／＼<br>　O　O<br>　＼／<br>　　C<br>　／＼<br>H$_3$C　COOEt | [m] | 12.7 | 601 | 303 (7) | 271 (15) | 257 (20) | 229 (35) | 338 (8) | 264 (35) |

1. Et-4Glc-3Gal is equivalent to 4-O-ethyl-2,3,6-tri-O-methyl-D-Glcp(1,4)-1,5-di-O-ethyl-2,4,6 tri-O-methylglucitol, etc.
2. values in parentheses equal the relative intensity of the fragment ions.

The nomenclature of Kochetkov and Chizhov, in *Advan. Carbohydr. Chem.*, Vol. 21 (1965), pages 39–93, will be used in describing the e.i. mass spectra of the alkylated oligoglycsyl alditols. Thus, the terminal non-reducing hexosyl residue of an alkylated diglycosyl alditol is designated as residue "a", the internal hexosyl residue as residue "b", and the alditol fragment as "ald", as suggested by B. Nilsson and D. Zopf in *Methods Enzymol.*, Vol. 83 (1982), pages 46–58. The ions from the A and J series are particularly important, for these ions give information about the location of O-ethyl groups in the alkylated oligoglycosyl alditols and thus give the points of attachment in the polysaccharide of other glycosyl residues.

Fragment ions at m/z 219, 233, and 247 correspond to the aA$_1$ ions of terminal non-reducing hexosyl residues that contain zero, one, or two O-ethyl groups, respectively. A terminal non-reducing residue in the polysaccharide would have no O-ethyl group attached in the alkylated oligoglycosyl alditol. An unbranched internal glycosyl residue in the polysaccharide would contain one O-ethyl group attached when it is in a terminal non-reducing position in the alkylated oligoglycosyl alditol, the O-ethyl group would indicate the point of substitution of the glycosyl residue in the polysaccharide. A branched glycosyl residue in the polysaccharide would contain two O-ethyl groups when it is in a terminal non-reducing position in the alkylated oligoglycosyl alditol.

The A$_1$ ions of the alkylated oligoglycosyl alditols can lose methanol (m/z 32) or ethanol (m/z 46) to yield A$_2$ ions. Alkyl groups are eliminated more readily from 0-3 than from 0-4, and from 0-4 more readily than 0-6, as suggested in Kochetkov et al., supra. The intense ion at m/z 201 in the mass spectrum of the alkylated monoglycosyl alditol [c] (see Table 4) corresponds to the elimination of methanol from the aA$_1$ ion and shows that the O-ethyl group on residue "a" is not located at 0-3. In contrast, the intense ion at m/z 187 in the e.i. mass spectrum of the monoglycosyl alditol [f] (see Table 4) corresponds to the elimination of ethanol from the aA$_1$ ion and establishes that the O-ethyl group is located on 0-3 of residue "a".

The number of O-ethyl groups attached to the alditol of the alkylated oligolycosyl alditols is delineated by aldJ$_2$ ions according to Aman et al., supra. An ion at m/z 264 is present if the alditol contains two O-ethyl groups which would establish that the glycosyl residue of the polysaccharide from which that alditol was derived was not branched. (See [c], [f], [g], [l], and [m], Table 4). An aldJ$_2$ ion at m/z 278 is present if the alditol contains three O-ethyl groups which would establish that the glycosyl residue of the polysaccharide from which that alditol was derived was branched. (See [d], [h], and [i], Table 4). The presence of an O-ethyl group on 0-3 of residue "a" of the monoglycosylalditol derivatives is established by an aldJ$_1$ ion at m/z 338 (aldJ$_2$ ion at m/z 264). (See [f], Table 4.)

Evidence for the existence of a branched 2,4-linked glucosyl residue in the polysaccharide was provided by characterizing two alkylated monoglycosyl alditol fragments ([d] and [l], Table 4) and one alkylated diglycosyl alditol fragment ([a], Table 5). The e.i. mass spectrum of [d] contained ions at m/z 219 (aA$_1$) and 278 (aldJ$_2$) and established that it had a terminal non-reducing hexosyl residue (that is, containing no O-ethyl groups) attached to a branched hexitol residue (that is, containing three O-ethyl groups). The point of attachment to the alditol could not be determined from the e.i. mass spectrum of [d]. However, glycosyl-linkage composition analysis of [d] showed the presence of a terminal non-reducing glucosyl residue and 2,4-linked glucitol.

The A series of fragment ions in the e.i. mass spectrum of [l] (see Table 4) established that residue "a" was branched (that is, contained two O-ethyl groups). The aldJ$_2$ ion at m/z 264 gave the mass of the alditol and established that it was a linear residue (that is, contained two O-ethyl groups). The presence of an aldJ$_1$ ion at m/z 324 indicated that residue "a" is substituted at 0-3 with an O-methyl group. The e.i. mass spectrum of [l] in combination with its glycosyl-linkage composition established that the 2,4-linked glucosyl residue is attached to 0-3 of the 3-linked galactosyl residue.

The mass of residue "a" of [a] (see Table 5) was obtained from the aA$_1$ ion at m/z 247 which showed that residue "a" was a branched hexosyl residue (that is, contained two O-ethyl groups). The intense ion at m/z 215 corresponds to the fragment ion aA$_1$ - 32 which resulted from the elimination of methanol from 0.3. The aldJ$_2$ fragment ions at m/z 278 indicates that the alditol was branched (that is, contained three O-ethyl groups). The baA$_1$ ion at m/z 451 indicated that residue "b" contained only O-methyl groups. Characterization of alkylated diglycosyl alditol [a] by analysis of its constituent alkylated alditol acetates according to the method of Valent et al., supra. established that a 4,6-linked hexosyl residue was at the non-reducing end, a 4-linked unbranched hexosyl residue at the internal position and 2,4-linked glucitol at the reducing end.

The M+NH$_4$ ions at m/z 601 and 805, respectively, in the c.i. mass spectra of alkylated oligoglycosyl alditols [m] (Table 4) and [b] (Table 5) confirmed that the ketosidically linked 1-carboxyethylidene residue was retained during formolysis and that the carboxyl group of the 1-carboxyethylidene residue was ethyl-esterified. The mass of the alkylated glycosyl residue "a" containing the ethyl esterified 1-carboxyethylidene group was obtained from the aA$_1$ ion in the e.i. mass spectrum. An aA$_1$ ion at m/z 303 (see [m], Table 4, and [b], Table 5) established that "a" is a hexosyl residue containing one O-ethyl group in addition to an ethyl-esterified 1-carboxyethylidene group. The aldJ$_2$ ion at m/z 264 in the e.i. mass spectrum of [m] established that the hexitol was branched (that is, contained two O-ethyl groups). The aldJ$_1$ ion at m/z 338 indicated that the O-ethyl group on residue "a" was attached to 0-3. Thus, the masses of the A and J fragment ions established that the 1-carboxyethylidene groups are linked to a 3-linked hexosyl residue. Glycosyl-linkage analysis of [m] showed the presence of 1,4,5,6-tetra-0-acetyl-2-0-methyl-3-0-ethylglucitol, confirming that the pyruvylated glucosyl residue is linked through 0-3.

The J series of fragment ions were important in reducing the sequence of the glycosyl residues in alkylated diglycosyl alditol [b] (see Table 5), which contained an ethyl-esterified 1-carboxyethylidene group. The presence of the aldJ$_0$ ion at m/z 310 (see Table 5) indicated that the internal hexosyl residue (residue "b" of [b] is 3-linked. The A series of fragment ions and the baldJ$_1$ ion at m/z 542 (see Table 5) indicated that residue "a" contained an ethyl-esterified 1-carboxyethylidene group as well as an 0-ethyl group at 0-3. The point of attachment to the alditol could not be determined from the e.i. mass spectrum of [b]. However, glycosyl linkage analysis of [b] established the presence of 6-linked glucitol.

Characteristics of the glycosyl sequence of the acidic polysaccharide secreted by Agrobacterium sp. as revealed by structural characterization of the alkylated oligoglycosyl alditols that were obtained from the methylated polysaccharide by partial formolysis reduction, and O-Ethylation - A total of 17 partially methylated, partially ethylated oligoglycosyl alditols (Tables 4 and 5) were isolated from the partial formolysis products of the methylated polysaccharide and structurally characterized. These overlapping fragments provide strong evidence for the entire sequence of glycosyl residues in the repeating unit of the polysaccharide shown above. Alkylated mono- and diglycosyl alditols [a], [c], [i], [g], [j], [1], [n], and [q] show that the backbone of the polysaccharide is composed of six β-linked glucosyl residues and two galactosyl residues. One of the backbone glucosyl residues is linked through both 0-2 and 0-4. Fragments [1] and [q] establish that the 2,4-linked glucosyl residue is attached to 0-3 of one of the two 3-linked galactosyl residues of the backbone. Fragment [d] established that a terminal, non-reducing glucosyl residue is linked to 0-2 of the 2,4-linked glucosyl residue. The remaining 3-linked galactosyl residue is substituted at 0-3 with an unbranched 4-linked glucosyl residue (fragments [c] and [j]).

The backbone of the polysaccharide contains two glucosyl residues linked through both 0-4 and 0-6. The positions of the two 4,6-linked glucosyl residues of the backbone are defined by fragments [a] and [n]. Fragment [a] shows that one of the 4,6-linked glucosyl residues is separated by a single 4-linked glucosyl residue from the 2,4-linked glucosyl residue, while fragment [n] establishes that the other 4,6-linked glucosyl residue has two consecutive 4-linked glucosyl residues at its reducing end, as shown above.

The sequence of glycosyl residues in the side-chain attached to 0-6 of the 4,6-linked glucosyl residue is defined by the fragments [b], [e], [f], [g], [h], [m], [o], and [p]. Attachment of the 6-linked glucosyl residue to 0-6 of the 4,6-linked glucosyl residue is shown by fragments [e], [h], [o], and [p]. The 6-linked glucosyl residue attached to the branched 4,6-linked glucosyl residue is substituted through 0-6 by a 3-linked glucosyl residue (fragments [b], [e], [f], and [p]), the 3-linked glucosyl residue is substituted through 0-3 by the 3-linked glucosyl residue containing the 1-carboxyethylidene group linked at 0-4 and 0-6 (fragments [b], [k] and [m]).

Most of the 1-carboxyethylidene groups were s removed from the polysaccharide by partial depolymerization with 50 mM TFA (Table 3, column III); this accounts for the presence of fragment [k], The 1-carboxyethylidene groups that remained after partial aqueous acid hydrolysis of the polysaccharide were stable to treatment with 90 percent formic acid. Fragments [b] and [m] demonstrate that the 1-carboxyethylidene is located on 0-4 and 0-6 of a glucosyl residue that has another glycosyl residue attached to 0-3.

The structure of the backbone of the polysaccharide contains two 3-linked galactosyl residues linked to the 4,6-linked glucosyl residues. However, no alkylated oligoglycosyl alditol containing a galactosyl residue attached to the 4,6-linked glucosyl residue was found. This can be attributed to the fact that 80 percent of the glycosidic linkages of the methylated 3-linked galactosyl residues were hydrolyzed during the treatment of the methylated polysaccharide with 90 percent formic acid (data not shown). Therefore, these results did not conclusively prove that the 3-linked galactosyl residues are s linked to 0-4 of the 4,6-linked glucosyl residues. Furthermore, the partial formolysis of the methylated polysaccharide hydrolyzed 70 percent of the methylated terminal nonreducing glucosyl residues (data not shown) which accounts for the fact that no alkylated oligoglycosyl alditol containing a 4,6-0-(1-carboxyethylidene) glucosyl residue substituted through 0-3 with a methylated terminal nonreducing glucosyl residue was found. Therefore, it remained possible that the 3-linked galactosyl residues were linked to 0-3 of the 3-linked 4,6-0-(1-carboxyethylidene) glucosyl residues. The point of attachment of the 3-linked galactosyl residues and the anomeric configuration of their glycosidic linkages were determined by subjecting the polysaccharide to Smith degradation.

Smith Degradation of the polysaccharide. The polysaccharide was subjected to Smith degradation according to the method of Goldstein et al in *Methods Carbohydr. Chem*, Vol. 5 (1965), pages 361–370, to determine whether the 3-linked galactosyl residues are attached to the 4,6-linked glucosyl residues. The 3-linked galactosyl residues do not contain vicinal hydroxyl groups and are, therefore, resistant to periodate oxidation. However, the 4-, 6-, and 4,6-linked glucosyl residues are oxidized by periodate and the aldehyde groups produced can be reduced with NaBH₄ to form the corresponding non-cyclic acetals. The non-cyclic acetals are acid labile, being hydrolyzed with 0.5M TFA at room temperature. This procedure generates oligoglycosyl alditols terminated at the reducing end with erythritol or glycerol. Erythritol is derived from the oxidation of 4- and 4,6-linked glucosyl residues while glycerol is the product of the oxidation of 6-linked glucosyl residues.

Separation and characterization of the products of Smith Degradation - The diglycosyl alditols produced by Smith degradation of the polysaccharide were separated and purified by semi-preparative, high pH, anion-exchange chromatography with pulsed amperometric detection (h.p.a.e.-p.a.d.). Three diglycosyl alditols ([S1] - [S3]) were isolated and characterized by $^1$H-n.m.r. spectroscopy, and glycosyl-residue analysis and glycosyl-linkage composition analysis. The diglycosyl alditols were also methylated and characterized by g.l.c.m.s. (see Table 6).

TABLE 6

Some Characteristics of the structurally characterized methylated diglycosyl alditols obtained from the Smith degraded and methylated Agrobacterium sp polysaccharide.

| Oligosaccharide Structure | Oligosaccharide fragment | b.p.a.e. retention time (min) | c.i.-m.s. [M + 18]+ m/2 | aA$_1$ m/2 | aA$_2$ m/2 | aldJ$_1$ m/2 | aldJ$_2$ m/2 | aldJ$_0$ m/2 | baldJ$_1$ m/2 | baldJ$_2$ m/2 | baA$_1$ m/2 |
|---|---|---|---|---|---|---|---|---|---|---|---|
| Glc-3Gal-erythritol | [S1] | 9.5 | 604 | 219 (6) | 187 (44) | 207 (3) | 147 (6) | 193 (0) | 411 (1) | 351 (1) | 423 (1) |
| Glc-3Glc-glycosyl | [S2] | 13.5 | 560 | 219 (12) | 187 (56) | 163 (12) | 103 (18) | 149 (0) | 367 (2) | 307 (3) | 423 (1) |

TABLE 6-continued

Some Characteristics of the structurally characterized methylated diglycosyl alditols obtained from the Smith degraded and methylated Agrobacterium sp polysaccharide.

| Oligosaccharide Structure | Oligosaccharide fragment | b.p.a.e. retention time (min) | c.i.-m.s. [M + 18]+ m/z | aA$_1$ m/z | aA$_2$ m/z | aldJ$_1$ m/z | aldJ$_2$ m/z | aldJ$_0$ m/z | baldJ$_1$ m/z | baldJ$_2$ m/z | baA$_1$ m/z |
|---|---|---|---|---|---|---|---|---|---|---|---|
| Glc—3Glc-glycosyl<br>  / \<br> O   O<br>  \ /<br>   C<br>  / \<br>H$_3$C   COOMe | [S3] | 39.5 | 616 | 275 (14) | 243 (13) | 163 (7) | 103 (32) | 149 (1) | — | 307 (2) | — |

1. Glc-3Gal-erythritol is equivalent to 2,3,4,6-beta-o-methyl-D-Glcp(1,3)-2,4,6-tri-O-methyl-Galp(1,2) 1,3,4-tri-O-methyl erythritol.
2. Values in parentheses are the relative intensities of the fragment ions.

The $^1$H-n.m.r. spectra of diglycosyl alditols [S1] - [S3] contained signals for anomeric protons in the region δ4.40 - 4.90 with J$_{1,2}$ coupling constants between 7.4 and 7.8 Hz, establishing that the diglycosyl alditols derived from the polysaccharide by Smith degradation contain only β-linked hexosyl residues. The $^1$H-n.m.r. spectrum of [S3] also contained a signal δ1.46, which was assigned to the methyl protons of a 4,6-0-[(S)-1-carboxyethylidene] group based on the work of Garegg et al in Carbohydr. Res., Vol. 78 (1980), pages 127–132.

The e.i. mass spectrum of the methylated diglycosyl alditol derived from [S1] contained an aldJ$_2$ ion at m/z 147 which established that its "ald" was a tetraitol. s Glycosyl composition analysis of [S1] showed that the tetraitol was erythritol. Erythritol can be derived from either a 4- or 4,6-linked glucosyl residue. The linkage to the erythritol could not be determined from the e.i. mass spectrum of the methylated diglycosyl alditol. Glycosyl-linkage composition analysis of [S1] showed that the methylated diglycosyl alditol contained terminal non-reducing glucosyl and 3-linked galactosyl residues. The methylated alditol acetate derived from the erythritol residue was too volatile to be analyzed by the glycosyl-linkage composition analysis procedure. However, the analysis of [S1] (see Table 6) did establish that the glucosyl residue attached to the 3-linked galactosyl residue was resistant, in the polysaccharide, to periodate oxidation and, therefore, must have been the branched 2,4-linked glucosyl residue.

Structural analysis of diglycosyl alditol ([S3], see Table 6) confirmed that the (S)-1-carboxyethylidene groups was ketosidically linked to a glucosyl residue. The aA$_1$ ion at m/z 275 confirmed that the 1-carboxyethylidene group is located on a glucosyl residue that is resistant to periodate oxidation, i.e. a 3-linked glucosyl residue. The aldJ$_2$ ion at m/z 103 established that the "ald" was a triitol. Glycosyl composition analysis showed that the s triitol was glycerol. The glycerol could only be derived from a 6-linked hexosyl residue. Glycosyl-linkage composition analysis of [S3] showed terminal non-reducing glucosyl and 3-linked glucosyl residues to be present and, in combination with $^1$H-n.m.r. and mass spectral analysis, established the glycosyl sequence of the diglycosyl alditol (see Table 6).

Diglycosyl alditol [S2] was shown to have the same glycosyl sequence as [S3] except that the 4,6-O-[(S)-1-carboxyethylidene] group was not present. No evidence was provided by this experiment which could determine whether the 4,6-O-[(s)-1-carboxyethylidene] group was cleaved during the workup of the sample or whether some of the 3-linked glucosyl residues of the polysaccharide are not substituted with 1-carboxyethylidene groups.

Glycosyl sequence of the product obtained by periodate oxidation and reduction of the polysaccharide - The isolation and characterization of [S1] (see Table 6) as one of the products of Smith degradation of the acidic polysaccharide secreted by the Agrobacterium sp. indicated that a glucosyl residue that was resistant to periodate oxidation-reduction was attached to 0-3 of the β-D-galactosyl residue and that the 3-linked galactosyl residue was linked to erythritol. However, the erythritol in [S1] could be derived from either a 4-linked or 4,6-linked glucosyl residue. To distinguish between these two possibilities according to the method of Jansson et al in J. Amer. Chem. Soc., Vol. 99 (1977), pages 3812–3815, the polymer obtained by periodate oxidation followed by sodium borohydride reduction of the polysaccharide was methylated and treated with aqueous 90 percent formic acid at 45° C. for one hour to hydrolyze selectively the non-cyclic acetals. The resulting partially methylated oligoglycosyl alditols were found to be 0-ethylated. An erythritol residue derived from a 4,6-linked glucosyl residue would be substituted with two 0-ethyl groups whereas an erythritol derived from a 4-linked glucosyl residue would be substituted with only one O-ethyl group.

Separation and characterization of the alkylated oliqoclycosyl alditols formed after formolysis and O-ethylation of the methylated, periodate-oxidized and reduced polysaccharide - The alkylated oligoglycosyl s alditols were separated by reversed phase h.p.l.c. and the components in the h.p.l.c. fractions were analyzed by $^1$H-n.m.r. spectroscopy, g.l.c.-m.s. (c.i. and e.i.), and glycosyl-linkage composition analysis.

The $^1$H-.n.m.r. spectra of fractions [A1] - [A4] contained signals for anomeric protons in the region δ4.30 to 4.90 with J$_{1,2}$ coupling constants between 7.0 and 7.8 Hz, which is consistent with the presence of β-linked glycosyl residues; no signals could be attributed to the anomeric protons of α-linked glycosyl residues.

The e.i. mass spectrum of [A1] contained an aA$_1$ ion at m/z 233, which shows that residue "a" contained one O-ethyl group (Table 7). The aldJ$_2$ ion at m/z 175 established that the erythritol contained two O-ethyl groups (Table 5), which established that the erythritol originated from a 4,6-linked glucosyl residue. The aldJ$_1$ ion at m/z 249 indicated that the hexosyl residue is ethylated at 0-3. Glycosyl-linkage composition analysis of [A1] showed the presence of 1,5-di-0-acetyl-3-0-ethyl-2,4,6-tri-0-methylgalactitol. The point of substitution of the erythritol could not be determined since the alkylated erythritol derivative was too volatile to be analyzed by this procedure. However, the presence of two ethyl groups on the erythritol and the results of the mass spectral analysis confirmed that the 3-linked galactosyl residues are connected to 4,6-linked glucosyl residues.

The structures of [A2] and [A4] (Table 7) are in agreement with the results of partial formolysis of the methylated polysaccharide that established the sequence of the consecutive 3-linked glucosyl residues in the side-chain of the polysaccharide.

The e.i. mass spectrum of [A3] contained an $aA_1$ ion at m/Z 247 (see Table 7), which established that residue "a" was branched, that is, contained two O-ethyl groups. The $aA_1$-32 and $baldJ_1$ ions at m/z 215 and 439, respectively, established that residue "a" was not O-ethylated at position 3. The $aldJ_2$ ion at m/z 175 indicated that the erythritol contained two O-ethyl groups, that is, was derived from a 4,6-linked glucosyl residue. Glycosyl-linkage composition analysis of [A3] showed the presence of 1,5-di-O-acetyl-2,4-di-O-ethyl-3,6-tri-O-methylglucitol and 1,3,5-tri-O-acetyl-2,4,6-tri-O-methylgalactitol which in combination with the results of $^1$H-n.m.r. and mass spectral analysis established that in [A3], the 4-linked glucosyl residue attached to the 3-linked galactosyl residue is substituted at O-2 as shown in the structure above. These results confirmed the results obtained from partial formolysis of the methylated polysaccharide and Smith degradation of the unsubstituted polysaccharide, which established that approximately 50 percent of the 4-linked glucosyl residues attached to 3-linked galactosyl residues are also substituted at O-2, as shown in the repeating unit structure.

163 or 221 were also very weak in the e.i. mass spectra of [A2] - [A4], but the $aldJ_2$ ions were relatively intense (Table 7). Similar fragmentation patterns have been seen previously. The e.i. mass spectrum of the methylated diglycosyl-erythritol derivative [Rha-(1,3)-Gal-(1,2)-erythritol], obtained by periodate oxidation of the acidic polysaccharide secreted by Serratia marcescens, has been shown by Oxley et al, in Carbohydr. Res., Vol. 182 (1988), pages 101–110, to contain an $aldJ_0$ ion at m/z 193 of low intensity, but the corresponding $aldJ_1$ fragment ion at m/z 207 was not reported. However, the e.i. mass spectrum of a methylated diglycosyl-erythritol derivative [Rha-(1,3)-Gal-(1,2)-erythritol], obtained by periodate oxidation-reduction of the polysaccharide secreted by a Klebsiella has been reported by Dutton et al in Carbohydr. Res., Vol. 65 (1978), pages 251–263, to contain an intense $aldJ_1$ fragment ion at m/z 207. The mechanism by which the expected $aldJ_0$ and the observed $aldJ_1$ and $aldJ_2$ fragment ions are produced from the alkylated Smith degradation products obtained after periodate oxidation and reduction of the Agrobacterium polysaccharide is not known.

Determination of the ring forms of the glycosyl residues - Examination of the constituent alditol acetates of the methylated polysaccharide and the alkylated oligoglycosyl alditols showed that all the glycosyl residues are in the pyranose form. Glycosyl linkage analysis (Table 1) established that 1,5-di-O-acetyl-2,3,4,6-tetra-O-methylglucitol accounted for all the terminal non-

TABLE 7

Some characteristics of the structurally characterized alteylated mono- and di-glycosyl alditols obtained from the periodate oxidized-reduced, hydrolyzed and ethylated Agrobacterium sp polysaccharide.

| Oligosaccharide Structure | Oligosaccharide fragment | b.p.a.e. retention time (min) | c.i.-m.s. [M + 18]+ m/2 | $aA_1$ m/2 | $aA_2$ m/2 | $aldJ_1$ m/2 | $aldJ_2$ m/2 | $aldJ_0$ m/2 | $baldJ_1$ m/2 | $baldJ_2$ m/2 | $baA_1$ m/2 |
|---|---|---|---|---|---|---|---|---|---|---|---|
| Glc-3Gal-erythritol | [S1] | 9.5 | 604 | 219 (6) | 187 (44) | 207 (3) | 147 (6) | 193 (0) | 411 (1) | 351 (1) | 423 (1) |
| Glc-3Glc-glycosyl | [S2] | 13.5 | 560 | 219 (12) | 187 (56) | 163 (12) | 103 (18) | 149 (0) | 367 (2) | 307 (3) | 423 (1) |
| Glc—3Glc-glycosyl<br>/ \\<br>O  O<br>\\ /<br>C<br>/ \\<br>H$_3$C  COOMe | [S3] | 39.5 | 616 | 275 (14) | 243 (13) | 163 (7) | 103 (32) | 149 (1) | — | 307 (2) | — |

See Table 6

The presence of "$aldJ_2$" type fragment ions in the e.i. mass spectra of the alkylated diolycosyl alditols obtained by alkylation of the products of Smith degradation - The alkylated diglycosyl-glycerol and - erythritol derivatives obtained by alkylation of the products of Smith degration ([S1] - [S3]) and the products of periodate oxidation-reduction of the polysaccharide ([A2] - [A4]) were all shown to contain, by glycosyl-residue composition analysis, an internal 3-linked glycosyl residue (residue "b"). Therefore, it was expected that the e.i. mass spectra of [S1] - [S3] and [A2] - [A4] would contain an $aldJ_0$ ion considered diagnostic for 3-linked hexosyl residues, according to Sharp et al in Carbohydr. Res.. Vol. 128 (1984), pages 193–202. The $aldJ_0$ ion at m/z 193 was not present in the e.i. mass spectrum of the methylated diglycosyl alditol derived from [S1]: rather, an ion at m/z 207, corresponding to an aldJ ion was present (Table 6). The $aldJ_0$ fragment (m/z 149) was absent or very weak in the e.i. mass spectra of the methylated diglycosyl alditols derived from [S2] and [S3], but an ion at m/z 163 corresponding to the $aldJ_2$ fragment was present (see Table 6). The $aldJ_0$ ions at m/z reducing glucosyl residues. The pyranose form of the 3-linked 4,6-0-[(S)-1-carboxyethylidene] glucosyl residue was established by the fact that it is substituted with a 1-carboxyethylidene group attached to 0-4 and 0-6 (see alkylated oligoglycosyl alditols [b] and [m].) The pyranose forms of the remaining glycosyl residues were established according to the method of Aman, Albersheim et al, supra. by determining the positions of O-ethylation of the alkylated alditol acetate derivatives of each residue when the residue was situated at the reducing end of an alkylated oligoglycosyl alditol. (Compare the alkylated oligoglycosyl alditols [c], [f], [g], [h], and [i]).

Treatment of the polysaccharide with a phage endoglycanase that hydrolyzes a R meliloti 1021 polysaccharide that is structurally related to the polysaccharide secreted by the Agrobacterium species - The results described above provide strong evidence that the acidic polysaccharide secreted by the *Agrobacterium radiobacter* (ATCC 53271) is composed of a heptadecasaccharide repeating unit as shown above. Evidence that the acidic polysaccharide is not a mixture of polysaccharides was obtained by purification of the polysaccharide by precipitation with CTAB according to Scott et al and Robertson, Albersheim et al, supra, and by ion exchange chromatography; the single product in each case had a glycosyl composition identical with that of the native polysaccharide. Nevertheless, the chemical analysis did not conclusively prove that the *Agrobacterium sp.* polysaccharide is, in fact, a single polysaccharide with a 17 glycosyl residue repeat; there remained a possibility that there is a mixture of two polysaccharides, one with an octasaccharide repeating unit and the other with a nonasaccharide repeating unit, as indicated on the structure above. The glycosyl sequences of the octa- and nonasaccharide repeating units would be identical except that the nonasaccharide would contain a terminal non-reducing glucosyl residue linked to 0-2 of a 4-linked glucosyl residue that is, would have two branches. In an attempt to answer this question, the polysaccharide secreted by the *Agrobacterium sp.* was treated with a bacteriophage (M12) that contains an endoglycanase known to hydrolyze the glycosidic linkage between 4-linked β-D-glucosyl residues and 3-linked β-D-galactosyl residues in the backbone of the acidic polysaccharide produced by *Rhizobium meliloti* 1021 according to Glazebrook et al, in Cell. Vol. 56 (1989), pages 661-672. The structure of the backbone of the polysaccharide secreted by *Rhizobium meliloti* 1021 determined according to Aman et al, supra, is identical to the backbone of the octasaccharide portion of the polysaccharide secreted by the *Agrobacterium sp.* as shown in the structure above. If the *Agrobacterium sp.* produced two polysaccharides, the polysaccharide with the eight glycosyl residue repeating unit would have a glycosyl sequence identical to the polysaccharide produced by *R. meliloti* 1021 and, therefore, would be depolymerized by the phage endoglycanase.

The polysaccharides secreted by both the *Agrobacterium sp.* and by *R. meliloti* 1021 were treated with the phage endoglycanase. The products were desalted and analyzed by h.p.a.e.-p.a.d. (data not shown). The polysaccharide produced by *R. meliloti* 1021 was depolymerized into a mixture of its eight-glycosyl residue repeating unit (60 percent) and dimers of its eight-glycosyl residue repeating unit (40 percent). These repeating units were shown, by f.a.b.-m.s., to contain 0-acetyl, 0-succinyl, and 1-carboxyethylidene groups (data not shown). In contrast, the polysaccharide (or polysaccharides) produced by the *Agrobacterium sp.* were not depolymerized by the phage endoglycanase; the solution containing the *Agrobacterium sp.* polysaccharide remained viscous following treatment with the phage endoglycanase and no oligoglycosyl subunits were detected by h.p.a.e.-p.a.d. The inability of the phage endoglycanase to hydrolyze the polysaccharide produced by *Agrobacterium sp.* thus provides additional evidence that this polysaccharide exists as a single molecular species with a repeat unit containing alternating octaglycosyl and nonaglycosyl sequences.

REMARKS

The structure of the repeating unit of the polysaccharide secreted by this *Agrobacterium sp.* is related to the structure of the repeating unit of the polysaccharide secreted by *R. meliloti* 1021. However, structural analysis of this *Agrobacterium sp.* polysaccharide has provided evidence that this polymer is composed of a heptadecasaccharide repeating unit containing terminal non-reducing β-D-glucosyl group attached to 0-2 of every second 4-linked glucosyl residue that is linked to 0-3 of the galactosyl residue, as seen in the structural formula.

The fact that the polysaccharide SE-04 produced by this *Agrobacterium sp.* is not depolymerized by the phage endoglycanase that cleaved the polysaccharide produced by *R. meliloti* 1021 provides strong evidence that the *Agrobacterium sp.* polysaccharide is composed of alternating octa- and nonasaccharide sequences, which together constitute the heptadecasaccharide repeating unit. If the polysaccharide possessed several consecutive octasaccharide sequences equivalent to the repeating units of the polysaccharide produced by *R. meliloti* 1021, the phage endoglycanase would be expected to cleave these sequences and thereby reduce the molecular weight and viscosity of the *Agrobacterium sp.* polysaccharide. No evidence was found that the phage endoglycanase could hydrolyze any of the glycosidic bonds in the polysaccharide produced by the *Agrobacterium sp.* It appears that the presence of two side chains on the nonasaccharide portion of the 17 glycosyl residue repeat unit must change the conformation of the polysaccharide so that the octasaccharide portion no longer has the conformation required to be a substrate of the phage endoglycanase. However, the (S)-1-carboxyethylidene group of the polysaccharide secreted by *Agrobacterium sp.* is located on a 3-linked glucosyl residue of the tetraglycosyl side chain, in contrast to the (S)-1-carboxyethylidene group in the polysaccharide secreted by *R. meliloti* 1021, which is located on the terminal non-reducing glucosyl residue of the tetraglycosyl side chain. This difference would not be expected to alter the ability of the phage endoglycanase to cleave between the 4-linked glucosyl residue and the 3-linked galactosyl residue of the backbone, as the phage enzyme(s) reportedly cleaves the glycosidic linkage between 4-linked glucosyl residues and 3-linked galactosyl residues in a polysaccharide secreted by a mutant strain of *R. meliloti,* 1021 that has only a diglycosyl repeating unit, according to Glazebrook et al, supra.

The polysaccharide produced by the *Agrobacterium sp.* is highly unusual due to its repeating unit composed of as many as 17 glycosyl residues, since the largest bacterial polysaccharide repeating unit previously characterized has 11 glycosyl residues. (See Dudman, Albersheim et al in *Carbohydr. Res..* Vol. 117 (1983), pages 169-183.) Another unusual feature of the *Agrobacterium* polysaccharide is that three of the glucosyl residues in the repeating unit are branched; two 4,6-linked glucosyl residues and one 2,4-linked glucosyl residue. It is the only polysaccharide known to the researcher that has two different side chains in a repeating unit. To demonstrate unequivocally that the polysaccharide produced by the *Agrobacterium sp.* is composed of a heptadecasaccharide repeating unit it would be necessary to isolate an enzyme that is capable of depolymerizing the polysaccharide into its repeating unit.

EXPERIMENTAL METHODS AND GLOSSARY

Production and isolation of the polysaccharide - *Agrobacterium radiobacter* (ATCC #53271) was grown on medium (100 mls) containing 2.5 wt. percent glucose, 0.02 percent glutamic acid, 0.5 percent potassium phosphate (pH=7.2), 0.02 percent magnesium sulfate, 0.005 percent calcium chloride and trace amounts of Biotin, Pantothenic Acid, and manganese in a 250 ml Erlenmeyer flask. The flask was aerated by rotary shaking at 200 rpm and the polysaccharide was harvested when the glucose was consumed, usually 6–8 days. The polysaccharide was precipitated from the fermentation broth by the addition of isopropyl alcohol and redissolyed in de-ionized water, followed by precipation in isopropyl alcohol again. This process was repeated four times. The polymer was then redissolved in de-ionized water, centrifuged at 22,500 rpm (40,000 g) for one hour and precipitated in isopropyl alcohol. The polymer thus obtained was free from any protein contamination as measured by the Lowry method.

Glycosyl-residue composition analysis - The glycosyl composition of the polysaccharide was determined by g.l.c. (gas-liquid chromatography) of the alditol acetate and trimethylsilylmethylglycoside derivatives as described by York, Albersheim et al in Methods Enzymol., Vol. 1183 (1986), pages 3–40.

Determination of the absolute configuration of the lycosyl residues - The polysaccharide (1 mg) was treated for one hour at 120° with 2M trifluoroacetic acid (TFA). The TFA was removed under air and the residue treated for 16 hours at 80° with S-(+)-2-butanol/HCl. The S-(+)-2-butyl glycosides were trimethylsilyated and analyzed by g.l.c. as described by Leontein et al in *Carbohydr. Res.*, Vol. 62 (1978), pages 359–362.

Identification of pyruvylated qlycosyl residues - Glycosyl residues containing 1-carboxethylidene residues were released from the polysaccharide by treatment with M HCl in dry methanol for 16 hours at 80° C. The products were trimethylsilylated and examined by g.l.c.-e.i.m.s. (gas-liquid chromatography-electron impact mass spectrometry) as described by Dudman et al, supra.

Partial acid hydrolysis of the polysaccharide - The polysaccharide (50 mg) in water (100 ml) was heated to 80° C., trifluoracetic acid was added to 50 mM and the solution maintained at 80° C. for 1 hour. The cooled solution was dialyzed against deionized water and then freeze dried (yield 43 mg).

Methylation analysis - The native and acid-treated (50 mM TFA, 1 h, 80° C.) polysaccharides (50 µg) in methyl sulfoxide (200 µL) were treated with potassium dimethyl sulfinyl anion (100 µL of 2.0M) for 8 hours. The solutions were cooled to 4° C., methyl iodide (100 µL) was added, and the mixtures stirred for 6 hours at 20° C. Excess methyl iodide was evaporated and the methylated polysaccharide was dialyzed, and freeze dried. The procedure was repeated to ensure complete methylation.

Glycosyl linkage composition analysis - Glycosyl linkage analysis of the methylated polysaccharide (500 µg) and the alkylated oligoglycosl alditols were performed as described by York, Albersheim et al, supra.

Determination of the conditions for partial formolysis - Portions (250 µg) of the methylated polysaccharide were treated with 90% formic acid at 85° C. for 30, 45, and 90 minutes. Following reduction ($NaB_2H_4$) of the reducing terminal that had been exposed by the partial formolysis, the remaining glycosidic linkages were fully hydrolyzed (2M TFA 120° C., 1 h). The resulting partially methylated glycoses were reduced with $NaBH_4$, then acetylated, and analyzed as their partially methylated alditol acetates by g.l.c.-c.i.m.s. (gas-liquid chromatography-cation impact mass spectrometry; ammonia reagent gas).

Preparation of partially methylated, partially ethylated oligoglycosyl alditols - The polysaccharide (30 mg) that had been heated in 50 mM TFA at 80° C. for 1 hour was methylated and subjected to treatment with aqueous 90 percent formic acid at 85° C. for 30 minutes. The formic acid was removed under air and the reducing ends of the partially methylated oligosaccharides were converted, by reduction with $NaB_2H_4$, to oligoglycosyl alditols. The partially methylated oligoglycosyl alditols were ethylated as described by Valent, Albersheim et al, supra. The mixtures of partially methylated, partially ethylated oligoglycosyl alditols (3 mg) were separated by h.p.l.c. (High performance Liquid Chromatography, Bio Rad 700T liquid chromatograph) on a Zorbax ODS column (250 mm x 4.6 mm) eluting with aqueous 50 percent acetonitrile at 0.8 mL per minute. The eluate was monitored with a Hewlett Packard 1037A differential refractometer and the components were collected manually.

Smith degradation of the polysaccharide - A solution of the polysaccharide (50 mg) in 50 mM sodium periodate (100 mL) was kept in the dark at 20° C. for 48 hours. Excess periodate was then destroyed by addition of ethylene glycol (3 mL) and the solution dialyzed. Sodium borohydride (400 mg) was added and the solution kept for 8 hours at 20° C. Excess borohydride was destroyed by the addition of glacial acetic acid and the solution dialyzed and freeze dried. The periodate treatment was repeated to ensure complete oxidation of those glycosyl residues of the polysaccharide that possessed vicinal hydroxyls (yield 27 mg).

A solution (1 mL) of the periodate oxidized and $NaBH_4$ reduced polysaccharide (10 mg) in 10 mM imidazole/HCl, pH 7, was chromatographed on a column (1 x 5 cm) of DEAE-BioGel A by elution with 10 mM imidazole/HCl, pH 7 (30 mL), and then M imidazole/HCl, pH 7 (50 mL). The eluates were dialyzed and freeze dried, yielding 700 µg of neutral material (10 mM imidazole eluant) and 8.8 mg of the oxidized and reduced acidic polysaccharide (M imidazole eluant). The modified acidic polysaccharide (8 mg) in 0.5M TFA (1 mL) was kept for 48 hours at 20° C. The solution was concentrated to dryness under air and the remaining TFA removed by washing the residue with methanol (3 x 500 µL). A solution of the residue in water (600 µL) was filtered (0.2 µm Nylon 66 membrane) and portions (200 µL) fractionation by high pH anion-exchange (h.p.a.e.) chromatography on a semipreparative CarboPac 1 column (9 x 250 mm, Dionex Corp., Sunnyvale, Calif.) by elution at 5 mL per minute with 100 mM NaOH (0–20 minutes) followed by a 0–100 mM NaOAc gradient in 100 mM NaOH (20–35 minute), and finally 100 mM NaOAc in 100 mM NaOH (35–45 minute). The eluant was monitored with a pulsed amperometric detector (Dionex, Corp., Sunnyvale, Calif.) at 30 µamps sensitivity. Fractions were collected manually. The fractions were desalted (5 mL per cartridge) using OnGuard H cartridges (Dionex Corp.), concentrated to 1 mL, and freeze dried.

The glycosyl-residue compositions of the oligoglycosyl alditols purified by h.p.a.e. were determined by g.l.c. of their alditol acetates. The underivatized oligoglycosyl alditols were analyzed by $^1$H-n.m.r. (nuclear magnetic resonance) spectroscopy and the methylated oligoglycosyl alditols were analyzed directly by g.l.c.-m.s. (e.i. and $NH_4$ c.i.) The glycosyl-linkage compositions were obtained by glc-ms (e.i.) analysis of their partially methylated alditol acetates.

Determination of the sequence of polycosyl residues in the periodate oxidized sodium borohydride-reduced polysaccharide - A solution of the periodate oxidized and NaBH$_4$ reduced polysaccharide (9 mg) in DMSO (1 mL) was methylated by the Hakomori procedure described by York, Albersheim et al, supra. The methylated product was isolated by dialysis against aqueous 50 percent ethanol and freeze-dried. A solution of the methylated product in aqueous 90 percent formic acid was kept for 1 hour at 45° C. The solution was concentrated to dryness under air and the residue washed with methanol (3 x 500 μL). A solution of the residue in DMSO (500 μL) was ethylated by the method of Leontein et al in Carbohydr Res. Vol. 62 (1978), pages 359-362, and the alkylated oligoglycosyl alditols purified using Spice C$_{18}$ cartridges (Rainin Instrument Co., Woburn, Mass.). The oligoglycosyl derivatives were separated by reversed phase h.p.l.c. on a Zorbax ODS column (46 x 250 mm) by elution with aqueous 50 percent acetonitrile at 0.8 mL per minute. The eluant was monitored with a differential refractive index detector and fractions collected manually. The partially purified alkylated oligoglycosyl alditols were characterized by g.l.c.-m.s. (e.i. and NH$_4$ c.i.), $^1$H-n.m.r. spectroscopy, and glycosyl linkage composition analysis.

Propagation of the R. meliloti bacteriophage - The bacteriophage M12 reported by Leontein et al, supra., was propagated in cultures (100 mL) of R. meliloti 7094 (an EPS mutant) grown in modified Bergersens media, (see McNeil, Albersheim et al, Carbohydr. Res., Vol. 146 (1986), pages 307-326), pH 7, supplemented with 500 μM CaCl$_2$. The phage lysate (110 mL) was filtered (0.2 μm membrane), concentrated to 10 mL, dialyzed against 1 mM K$_2$HPO$_4$, pH 7, containing 500 μM CaCl$_2$, and stored at 4° C. Bacterial plaque assays by the method of McNeil, Albersheim et al, supra, showed that the concentrated phage solution contained about 10$^9$ plaque forming units per mL.

Treatment of the polysaccharides produced by the Agrobacterium sp. and by R. meliloti 1021 with the phage endoglycanase - Solutions (5 mL) of each of the polysaccharides (1 mg) in 1 mM KPO$_4$, pH 7, containing 500 μM CaCl$_2$ were mixed with the concentrated phage solution (1 mL) and incubated for 48 hours at 30° C. under toluene. The solutions were dialyzed (1000 molecular weight cut off membrane) at 4° C. against water and freeze dried.

Analysis of the products of phage endoglycanase treatment - Solutions (600 μL) containing the phage and phage-treated polysaccharide (about 1 mg) in water were filtered (0.2 μm membrane) and portions (20 μL) of the filtrate were chromatographed and analyzed by h.p.a.e.-p.a.d. on a CarboPac 1 column (4.6 mm x 25 mm). The polysaccharide and any oligoglycosyl repeating units were eluted at 1 mL per minute with 100 mM NaOH containing 100 mM NaOAc (0-10 minutes) followed by a 100 mM - 500 mM NaoAc gradient in 100 mM NaOH (10-30 minutes), and finally 500 mM NaOAc in 100 mM NaOH (30-45 minutes). The eluant was monitored with a pulse amperometric detector (Dionex Corp.) at 1 μA sensitivity.

Mass spectrometry - A Hewlett Packard 5985 or 5987 GC/MS was used. Spectra were obtained in the chemical ionization (c.i. ammonia reagent gas) or electron impact (e.i.) modes. The alkylated oligoglycosyl alditols were separated by g.l.c. in a 15 m DB-1 column, using on-column injection. The g.l.c. was programmed to remain at 80° C. for 2 minutes, then to rise from 80° to 200° at 30° C. per minute, and, finally to 340° at 10° C. per minute.

$^1$H-N m r. spectroscopy. - Bruker AM 250 or Am 500 n.m.r. spectrometers were used. Spectra of the polysaccharide were obtained at 250 MHz in $^2$H$_2$O (75° C.) containing 0.1 sodium 2,2,3,3-tetradeuterio-4,4-dimethyl-4-silapentane (TDMSP) at 250 MHz. Chemical shifts (δ) are reported in p.p.m. downfield from internal TDMSP (δ=0.0). Spectra of the oligoglycosyl alditols were obtained at 500 MHZ in $^2$H$_2$O (20° C.). Chemical shifts are reported in p.p.m. relative to internal acetone (δ2.225 downfield from external Me$_4$Si δ=0.0). Spectra of the alkylated oligoglycosyl alditols were obtained at 500 MHz in (C$_2$H$_3$)$_2$CO containing 0.1% Me$_4$Si. Chemical shifts are reported in p.p.m. downfield from internal Me$_4$Si (δ=0.0).

EXAMPLE 3

The heteropolysaccharide of Example 1 showed a very good viscosity/concentration relationship in water and the viscosity remained unchanged in the presence of even 10 percent salt (9% NaCl:1% CaCl$_2$) (Table 8). This demonstrates the superiority of the heteropolysaccharide in its salt tolerance as compared with other thickeners. Many polysaccharides, such as xanthan gums, lose about 10 to 30 percent of their viscosities when salts are added to dilute aqueous solutions of such polymers.

TABLE 8

| Conc (ppm) | VISCOSITY (CPS) | | |
|---|---|---|---|
| | Water | 2% NaCl | 10% Salt |
| 2000 | 139 | 135 | 144 |
| 1000 | 35 | 35 | 35 |
| 750 | 21 | 22 | 20 |
| 500 | 11 | 11 | 10 |
| 250 | 4.2 | 4.2 | 4.5 |

EXAMPLE 4

To determine the influence of mechanically-induced shear degradation or the viscosity of SE-04 biopolymer, an 0.5 percent solution was sheared in a Waring Blendor for periods up to one hour. After standing for a period of time, viscosity was measured and data are given in Table 9.

TABLE 9

| SHEAR STABILITY OF SE04 (1000 PPM) | |
|---|---|
| Shear Time (min) | % Initial Viscosity |
| 0 | 100 |
| 3 | 100 |
| 5 | 98 |
| 10 | 94 |
| 15 | 87 |
| 30 | 78 |

EXAMPLE 5

SHEAR RATE (FLOW RATE) SENSITIVITY OF THE BIOPOLYMER

A further experiment was performed to determine the shear sensitivity of the heteropolysaccharide. The viscosity of 0.5 percent (w/v) solution of the polysaccharide was measured at different shear rates and the results reported below in Table 10.

TABLE 10

| SHEAR THINNING PROPERTIES OF SE04* (1000 ppm) | | | | | | |
|---|---|---|---|---|---|---|
| Solvent | $2.5S^{-1}$ | $15S^{-1}$ | $30S^{-1}$ | $60S^{-1}$ | $180S^{-1}$ | $300S^{-1}$ |
| H$_2$O | 63 | 34 | 23 | 16 | 9 | 7 |
| 2% NaCl | 40 | 28 | 19 | 14 | 8 | 7 |

*polymer has been enzyme treated, dialyzed and freeze dried.

A viscosity reduction with shear rate (i.e., "shear thinning") is a desirable property for oil recovery fluids, since it allows faster injection or lower injection pressures.

EXAMPLE 6

SE04 was grown in a 250 ml Erlenmeyer flask containing 100 ml of medium as described in Example 1. This is called corn steep liquor medium. The organism was also grown in a synthetic medium using 0.2 percent glutamic acid and a vitamin/metal solution instead of corn steep liquor. The vitamins were: myoinositol (final concentration - 0.0002 percent), thiamine (0.0002 percent), pantothenic acid (0.0008 percent), p-amino benzoic acid (0.0002 percent), riboflavin (0.0002 percent), nicotinic acid (0.0002 percent), biotin (0.0002 percent) and pyridoxine (0.0002 percent). Of these vitamins, at least biotin should be present, preferably in combination with pantothenic acid, while the others are optional. The metals were NaMoO$_4$ (0.0005 percent), MnCl$_2$ (0.0005 percent), CoCl$_2$ (0.0005 percent), H$_3$BO$_3$ (0.0005 percent), CaCl$_2$ (0.5 percent), FeSO$_4$ (0.0005 percent), CuSO$_4$ (0.0005 percent), and ZnSO$_4$ (0.0005 percent). The amino acids aspartic acid, glutamine, asparagine and arginine can also be used instead of glutamic acid. After one week growth at 30° C. at 200 rpm rotary shaking, the polymer was analyzed (Table 11). While the quantity of polymer produced (percent solids) was similar in both media, the specific viscosity at 1000 ppm was much higher for the polymer produced on the synthetic medium.

TABLE 11

| Medium | Broth Viscosity | % Solids | Specific Viscosity |
|---|---|---|---|
| Corn Steep Liquor | 4850 | 1.25 | 41 |
| Synthetic (Glutamic acid + Vitamins/Metals) | 4770 | 1.43 | 92 |

In Table 11 the viscosity is in cps. and the % Solids is the amount of precipitable material after addition of 10 fold excess isopropanol. The specific viscosity was measured on a 1000 ppm solution of polymer in 2 percent NaCl at 25° C. using a Brookfield Viscometer with a UL adaptor at a shear rate of 7.5 sec -1.

EXAMPLE 7

Comparison of Viscosities of SE-04 and other Agrobacterium Radiobacter Heteropolysaccharides Microbial heteropolysaccharides, most commonly xanthan gums, are used to increase the efficiency of oil recovery in water flooding of oil field reservoirs. This is done at low concentrations of the heteropolysaccharides and low viscosities. In this viscosity range (20–100 cps), the lower the amount of heteropolysaccharide under the more economical the process becomes. Table 12 shows that under the same conditions, the viscosity of the SE-04 polymer is higher than those of other Agrobacterium radiobacter heteropolysaccharides.

TABLE 12

| Viscosity of Agrobacterium Radiobacter Heteropolysaccharides | |
|---|---|
| Strain | Viscosity* |
| SE04 (ATCC 53271) | 92** |
| Shell's NCIB 11883 | 61*** |
| Merck's S0119 (ATCC 31643) | 30**** |

*All viscosities determined at a heteropolysaccharide concentration of 1000 ppm at a shear rate of 7.5 sec$^{-1}$ in the presence of >0.1% NaCl or KCl at a temperature of 25–30° C.
**See Example 6 above.
***U.S. Pat. No. 4,634,667, Example 2, Table 2.
****U.S. Pat. No. 4,259,451, Table in Col. 8.

EXAMPLE 8

Preparation and Testing of Biopolymer Gels

A series of SE-04 gels were prepared by varying biopolymer and crosslinker concentration in 2 percent NaCl to simulate a reservoir brine. After 2–3 days of aging at room temperature, these gels were evaluated for strength using a hydrostatic pressure test apparatus.

In determining the value and usefulness of the present gels produced according to the present invention a Gel Strength Test is used as described below.

GEL STRENGTH TEST

Initially, sea sand is added to the 1.0 ml mark of a 10 ml disposable glass pipet. Then the biopolymer solution is prepared in NaCl (2%) and is added to the 5 ml mark of the pipet. Then the solution is allowed to form a gel in the pipet by standing for 2–5 days at room temperature.

After a gel has formed, the pipet is filled with water or brine and is connected to a pressure gauge and pump capable of delivering additional water at 0.5 ml/min. (Note: The glass pipet is shielded in a copper tube). Water is then injected into the pipet assembly at 0.5 ml/min and an increase in pressure is observed as the gel is deformed against the sand mixture which blocks the outlet of the pipet. The gel strength is reported as the maximum pressure observed prior to the point where water ruptures the gel capsule and flows unrestricted from the pipet.

As shown in FIG. 1, gel strengths were optimum for 2000 ppm SE-04 using 100–200 ppm Cr$^{3+}$ for crosslinking. Weaker gels could be prepared at lower concentrations (500–1000 ppm) of biopolymer and Cr$^{3+}$ (25–200 ppm) which may also have potential in profile modification applications.

At 250 ppm, SE-04 rigid gels were not formed although an increase in viscosity was observed as shown in FIG. 2. Accompanying this viscosity increase is the development of thixotropy (see FIG. 3) which indicates that a viscoelastic network has been formed. Such solutions have potential in biomedical applications and in the suspension of solids in aqueous media (increasing the solids content of coal/water slurries or drilling muds).

A comparison of the present SE-04 gel strengths to those obtained from Pfizer "FLOCON 4800C", a commercially available xanthan gum biopolymer used for profile modification, is given in FIG. 3 for 1000 ppm and 2000 ppm biopolymer concentrations. Over the entire range of Cr$^{3+}$ cross-linker concentrations studied, gel strengths were observed to be higher for SE-04 than the commercial system.

Significantly, at 100-200 ppm $Cr^{3+}$, SE-04 gel strengths at 1000 ppm concentration are comparable to 2000 ppm gels of xanthan. Also, SE-04 gels can be obtained down to 25 ppm $Cr^{3+}$ while xanthan requires at least 100 ppm $Cr^{3+}$ to form gels.

EXAMPLE 9

Thermal Stability of Biopolymer Gels

In order to determine the thermal stability of the present SE-04 gels, samples were prepared of compositions of varying biopolymer concentrations and cation concentrations and compared with commercial gels, i.e., xanthan gels. The results of such tests (comparison) are shown below in Table 13.

It is noted that future reservoir profile modification treatments will require gels capable of withstanding temperatures in excess of 100° C.

Table 13 demonstrates that the commercially available gel system, xanthan gum+$Cr^{3+}$, undergoes syneresis at temperatures of 90° C. while SE-04 gels are stable to 120°-125° C. This additional thermal stability will be valuable in high temperature water flooding applications or may be of use in steamflooding EOR applications.

TABLE 13

THERMAL STABILITY OF SE-04 GELS[3]

| SE-04 Sample/Solvent-Conc | Gel Synthesis Temperature °C.[4] $Cr^{3+}$ Concentration (ppm) | | | | |
|---|---|---|---|---|---|
| | 50 | 75 | 100 | 150 | 200 |
| Sample A[1] | | | | | |
| H₂O-1000 ppm | — | 65 | 120 | 115 | 110 |
| 2% NaCl-1000 ppm | — | 85 | 125 | 115 | 110 |
| Sample B[2] | | | | | |
| NaCl-2000 ppm | 120 | — | 120 | 120 | 108 |
| Xanthan-2% Nacl, 2000 ppm Pfizer "Flocon 4800" | 90 | 90 | 90 | 90 | 90 |

[1]Sample A: 68 cps at 1000 ppm/2% NaCl
[2]Sample B: 90 cps at 1000 ppm/2% NaCl
[3]Gelation time = 2-3 days at room temperature.
[4]Two hours aging time at temperature; syneresis results in gel collapse and water expulsion Although the present invention has been described with reference to specific embodiments, references and details, various modifications and changes will be apparent to those skilled in the art, and are considered to be within the scope of the invention, which is limited only by the following claims.

We claim:

1. A method of enhancing the recovery of oil from a petroleum-rich reservoir comprising at least one step of injecting into said reservoir an aqueous solution of the heteropolysaccharide produced by the variant strain of Agrobacterium Radiobacter which is deposited under Accession Number ATCC 53271.

2. The method of claim 1 wherein said aqueous solution of said heteropolysaccharide is an aqueous drive fluid containing at least about 250 ppm of said heteropolysaccharide which is injected into said reservoir via at least on injection well therein and forced through the reservoir to facilitate the recovery of petroleum from at least one production well therein.

3. The method of claim 1 wherein said heteropolysaccharide is cross-linked by a trivalent metal cation.

4. The method of claim 3 wherein said metal cation is selected from the group consisting of chromium ($Cr^{3+}$), aluminum ($Al^{3+}$), iron ($Fe^{3+}$) and titanium ($Ti^{3+}$).

5. The method of claim 4 wherein said metal cation is $Cr^{3+}$.

6. The method of claim 1 wherein said metal cation is present in an amount effective to produce from said heteropolysaccharide a thermally stable low permeability gel which forms preferentially in high permeability zones of said formation, whereby said water fed into said reservoir is directed toward oil rich deposits of said formation to improve the recovery of oil therefrom.

7. The method of claim 6 wherein said low permeability gel is thermally stable at temperatures ranging from about 40° C. to about 125° C.

8. The method of claim 7 wherein said gel is thermally stable at temperatures ranging from about 110° to about 125° C, 9. The method of claim 1 wherein the concentration of said heteropolysaccharide in said solution is at least about 250 ppm.

10. The method of claim 1 wherein the concentration of said heteropolysaccharide in said solution is in the range of from about 500 to about 2500 ppm and the concentration of said metal cation is in the range of from about 25 to about 225 ppm.

11. The method of claim 10 wherein the concentration of said heteropolysaccharide in said solution is in the range of from about 1000 to about 2500 ppm and the concentration of said metal cation is in the range of from about 100 to about 200 ppm.

* * * * *